United States Patent
Yadappanavar et al.

(10) Patent No.: US 9,038,066 B2
(45) Date of Patent: May 19, 2015

(54) IN-PLACE SNAPSHOTS OF A VIRTUAL DISK CONFIGURED WITH SPARSE EXTENT

(71) Applicant: VMware, Inc., Palo Alto, CA (US)

(72) Inventors: Krishna Yadappanavar, Sunnyvale, CA (US); Faraz Shaikh, Sunnyvale, CA (US); Murali Vilayannur, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 270 days.

(21) Appl. No.: 13/631,418

(22) Filed: Sep. 28, 2012

(65) Prior Publication Data

US 2013/0036418 A1 Feb. 7, 2013

Related U.S. Application Data

(63) Continuation-in-part of application No. 12/976,123, filed on Dec. 10, 2010.

(51) Int. Cl.
*G06F 9/455* (2006.01)
*G06F 3/06* (2006.01)

(52) U.S. Cl.
CPC ............ *G06F 3/0611* (2013.01); *G06F 3/0667* (2013.01); *G06F 3/067* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 5,604,902 A | 2/1997 | Burkes et al. | |
| 6,185,665 B1 * | 2/2001 | Owada et al. | 711/170 |
| 7,412,702 B1 * | 8/2008 | Nelson et al. | 718/1 |
| 7,529,897 B1 * | 5/2009 | Waldspurger et al. | 711/162 |
| 7,620,766 B1 * | 11/2009 | Waldspurger | 711/6 |
| 7,725,506 B1 | 5/2010 | Stringham | |
| 2008/0155223 A1 * | 6/2008 | Hiltgen et al. | 711/173 |
| 2008/0189700 A1 * | 8/2008 | Schmidt et al. | 718/1 |
| 2009/0113109 A1 * | 4/2009 | Nelson et al. | 711/6 |
| 2010/0057818 A1 | 3/2010 | Gao et al. | |
| 2010/0162239 A1 * | 6/2010 | Wires et al. | 718/1 |
| 2010/0235831 A1 | 9/2010 | Dittmer | |
| 2010/0280996 A1 | 11/2010 | Gross, IV et al. | |
| 2010/0299667 A1 * | 11/2010 | Ahmad et al. | 718/1 |
| 2011/0145534 A1 * | 6/2011 | Factor et al. | 711/170 |
| 2011/0197022 A1 | 8/2011 | Green et al. | |

* cited by examiner

*Primary Examiner* — Emerson Puente
*Assistant Examiner* — Dong Kim

(57) ABSTRACT

A virtualized computer system employs a virtual disk with a space efficient (SE) format to store data for virtual machines running therein. Data within a virtual disk with a SE format is stored in a grain, where multiple grains are included in a storage block. Writes to a grain within shared storage block in a virtual disk with an SE format are serviced by allocating a new grain and storing the write data to the new grain. Metadata associated with the client that transmitted the write request to the virtual disk is then updated to point to the new grain instead of the grain within the shared storage block.

21 Claims, 16 Drawing Sheets

| | 520 |
|---|---|
| GTE #0 | Sector Offset to Grain (if any) |
| GTE #1 | Offset to Grain 510 |
| GTE #2 | Sector Offset to Grain (if any) |
| GTE #3 | Sector Offset to Grain (if any) |
| ⋮ | ⋮ |
| GTE #511 | Sector Offset to Grain (if any) |

522

| Grain No. | Used | Allocated but Unused | Not Allocated |
|---|---|---|---|
| Grain #0 | X | - | - |
| Grain #1 | X | - | - |
| Grain #2 | X | - | - |
| Grain #3 | - | - | X |
| Grain #4 | - | - | X |
| Grain #5 | - | - | X |
| Grain #6 | - | - | X |
| ⋮ | | | |
| Grain #2550 | X | - | - |
| Grain #2551 | X | - | - |
| ⋮ | | | |
| Grain #2559 | - | - | X |

| Grain No. | Used | Allocated but Unused | Not Allocated |
|---|---|---|---|
| Grain #0 | X | - | - |
| Grain #1 | X | - | - |
| Grain #2 | X | - | - |
| Grain #3 | - | - | X |
| Grain #4 | - | - | X |
| Grain #5 | - | - | X |
| Grain #6 | - | - | X |
| ... | | ... | |
| Grain #2550 | X | - | - |
| Grain #2551 | X | - | - |
| ... | | ... | |
| Grain #2559 | - | - | X |

630

626

| | |
|---|---|
| GTE #0 | Sector Offset to Grain (if any) |
| GTE #1 | Offset to Grain Y |
| GTE #2 | Sector Offset to Grain (if any) |
| GTE #3 | Sector Offset to Grain (if any) |
| ... | |
| GTE #511 | Sector Offset to Grain (if any) |

622

624

Sparse Extent Metadata Copy
620

FIGURE 6C

IN-PLACE SNAPSHOTS OF A VIRTUAL DISK CONFIGURED WITH SPARSE EXTENT

CROSS-REFERENCE TO RELATED APPLICATIONS

This application is a continuation-in-part of U.S. patent application Ser. No. 12/976,123, filed Dec. 22, 2010, entitled "Guest File System Introspection and Defragmentable Virtual Disk Format for Space Efficiency," now issued as U.S. Pat. No. 8,874,859 the entire contents of which are incorporated by reference herein.

BACKGROUND

Computer virtualization is a technique that involves encapsulating a physical computing machine platform into a virtual machine that is executed under the control of virtualization software on a hardware computing platform, or "host." A virtual machine (VM) has both virtual system hardware and guest operating system software. Virtual system hardware typically includes at least one "virtual disk," a single file or a set of files that appear as a typical storage drive to the guest operating system. The virtual disk may be stored on the host platform or on a remote storage device. Typically, a virtual machine uses the virtual disk in the same manner that a physical storage drive is used, to store the guest operating system, application programs, and application data.

A virtual disk is typically organized as a set of logical data blocks that are accessed by a VM via a file descriptor associated with a virtual disk. Multiple VMs may share a data block of the virtual disk, such that multiple file descriptors reference the data block. A shared data block is treated as read-only and marked as "copy-on-write." Therefore, a write IO transmitted by a VM targeting a shared data block results in the allocation of a new data block. The contents of the entire data block are then copied to the newly allocated data block, and the write IO is performed on the newly allocated data block. Writing to a shared data block adds time and processing overhead as an entire data block must be copied before the write operation can be performed. If multiple VMs share many data blocks of a virtual disk, write operations can become very slow resulting in the degradation of the overall performance of the virtualized environment.

As the foregoing illustrates, what is needed in the art is a mechanism for writing to a shared data block of a virtual disk with minimal impact to performance.

SUMMARY

One or more embodiments of the invention provide techniques for writing to a shared data block of a virtual disk being access by multiple virtual machines.

A method for creating a snapshot in response to a write request associated with a data block shared by a plurality of virtual machines includes the steps of receiving a write request from a virtual machine served by the virtual disk for writing data to a first portion in the virtual disk, and writing the data to a second portion of the virtual disk. The method also includes the steps of making a copy of metadata associated with a snapshot of the virtual disk, and updating the copy of the metadata to modify a reference pointing to the first portion to point to the second portion, wherein any subsequent read requests received from the virtual machine for reading from the first portion are serviced by transmitting the data from the second portion to the virtual machine.

Embodiments of the present invention further include a non-transitory computer-readable storage medium storing instructions that when executed by a computer system cause the computer system to perform one or more of the methods set forth above, and a computer system that is configured to carry out one or more of the methods set forth above.

BRIEF DESCRIPTION OF THE DRAWINGS

FIG. 6B illustrates a detailed view of grain table and grain bitmap after the write request associated with grain X is processed.

FIG. 6C illustrates a detailed view of a sparse extent metadata copy created after the write request associated with grain X is processed.

DETAILED DESCRIPTION

Figure 1:
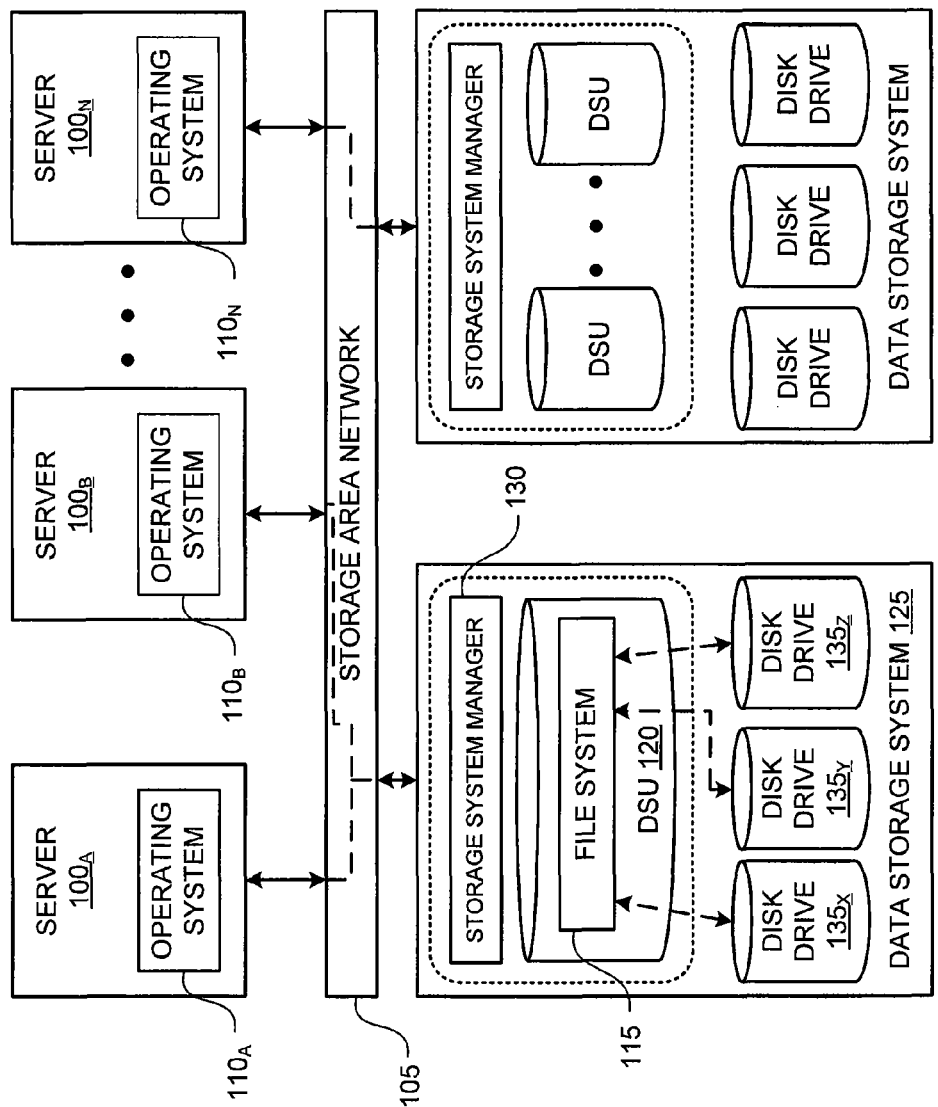
FIG. 1 is a computer system configuration utilizing a shared file system, according to an embodiment.

FIG. 1 illustrates a computer system configuration utilizing a shared file system, according to one embodiment. The computer system configuration of FIG. 1 includes multiple servers $100_A$ to $100_N$ each of which is connected to storage area network (SAN) 105. Operating systems $110_A$ and $110_B$ on servers $100_A$ and $100_B$ interact with a shared file system 115 that resides on a data storage unit (DSU) 120 accessible through SAN 105. In particular, data storage unit 120 is a logical unit (LUN) of a data storage system 125 (e.g., disk array) connected to SAN 105. While DSU 120 is exposed to operating systems $110_A$ to $110_B$ by system storage manager 130 (e.g., disk controller) as a contiguous logical storage space, the actual physical data blocks upon which shared file system 115 may be stored is dispersed across the various physical disk drives $135_X$ to $135_Z$ of data storage system 125.

Data in DSU 120 (and possibly other DSUs exposed by the data storage systems) are accessed and stored in accordance with structures and conventions imposed by shared file system 115 which, for example, stores such data as a plurality of files of various types, typically organized into one or more directories. Shared file system 115 further includes metadata data structures that store or otherwise specify information, for example, about how data is stored within shared file system 115, such as block bitmaps that indicate which data blocks in shared file system 115 remain available for use, along with other metadata data structures indicating the directories and files in shared file system 115, along with their location. For example, sometimes referred to as a file descriptor or inode, each file and directory may have its own metadata data structure associated therewith, specifying various information, such as the data blocks that constitute the file or directory, the date of creation of the file or directory, etc.

Figure 2:
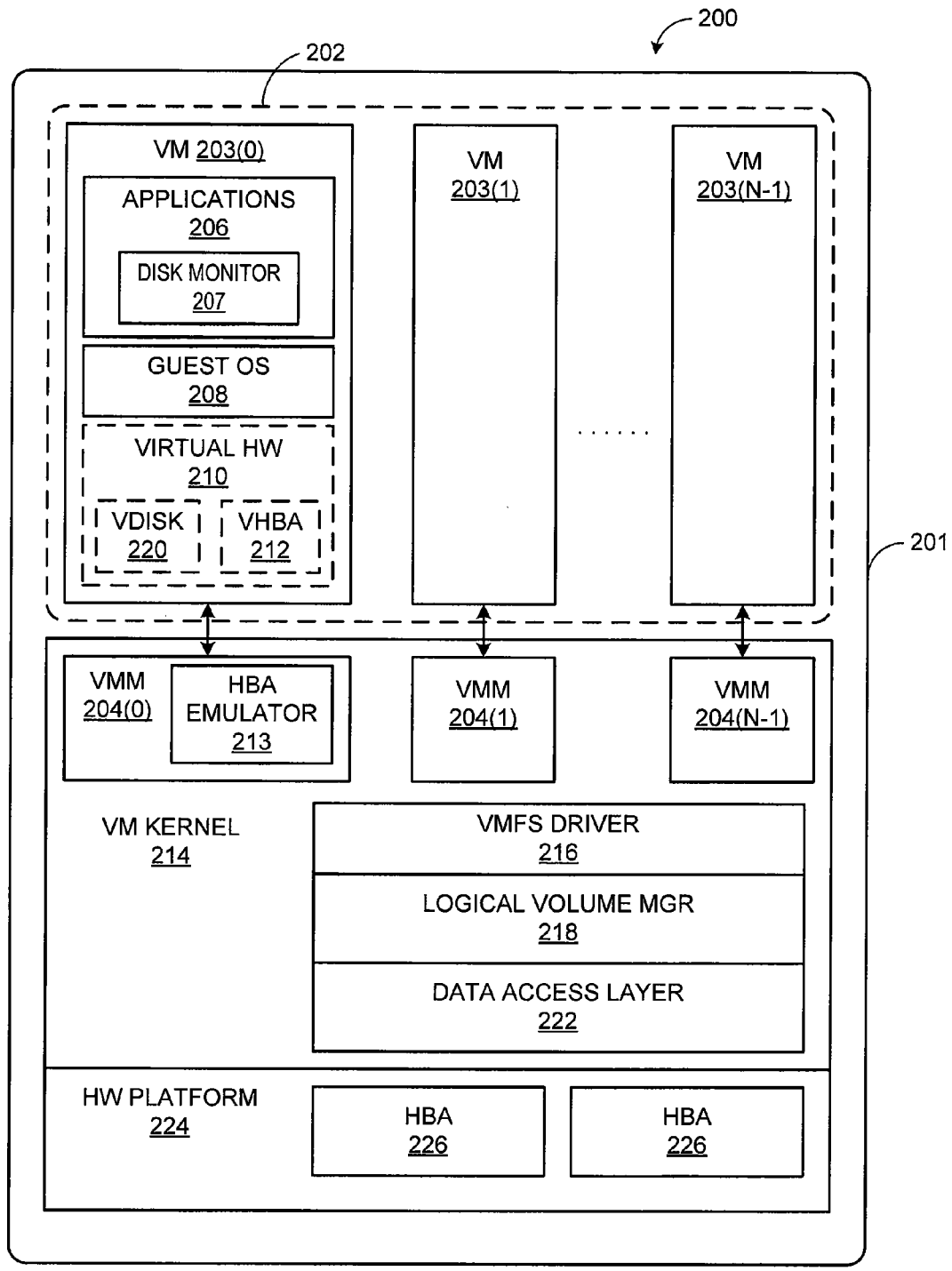
FIG. 2 is a virtual machine based computer system, according to an embodiment.

FIG. 2 illustrates a virtual machine based computer system 200, according to an embodiment. A computer system 201, generally corresponding to one of the servers 100, is constructed on a conventional, typically server-class hardware platform 224, including, for example, host bus adapters (HBAs) 226 that network computer system 201 to remote data storage systems, in addition to conventional platform processor, memory, and other standard peripheral components (not separately shown). Hardware platform 224 is used to execute a hypervisor 214 (also referred to as virtualization software) supporting a virtual machine execution space 202 within which virtual machines (VMs) 203 can be instantiated and executed. For example, in one embodiment, hypervisor 214 may correspond to the vSphere product (and related utilities) developed and distributed by VMware, Inc., Palo Alto, Calif. although it should be recognized that vSphere is not required in the practice of the teachings herein.

Hypervisor 214 provides the services and support that enable concurrent execution of virtual machines 203. Each virtual machine 203 supports the execution of a guest operating system 208, which, in turn, supports the execution of applications 206. Examples of guest operating system 208 include Microsoft® Windows®, the Linux® operating system, and NetWare®-based operating systems, although it should be recognized that any other operating system may be used in embodiments. Guest operating system 208 includes a native or guest file system, such as, for example, an NTFS or ext3FS type file system. The guest file system may utilize a host bus adapter driver (not shown) in guest operating system 208 to interact with a host bus adapter emulator 213 in a virtual machine monitor (VMM) component 204 of hypervisor 214. Conceptually, this interaction provides guest operating system 208 (and the guest file system) with the perception that it is interacting with actual hardware.

FIG. 2 also depicts a virtual hardware platform 210 as a conceptual layer in virtual machine 203(0) that includes virtual devices, such as virtual host bus adapter (HBA) 212 and virtual disk 220, which itself may be accessed by guest operating system 208 through virtual HBA 212. In one embodiment, the perception of a virtual machine that includes such virtual devices is effectuated through the interaction of device driver components in guest operating system 208 with device emulation components (such as host bus adapter emulator 213) in VMM 204(0) (and other components in hypervisor 214).

File system calls initiated by guest operating system 208 to perform file system-related data transfer and control operations are processed and passed to virtual machine monitor (VMM) components 204 and other components of hypervisor 214 that implement the virtual system support necessary to coordinate operation with hardware platform 224. For example, HBA emulator 213 functionally enables data transfer and control operations to be ultimately passed to the host bus adapters 226. File system calls for performing data transfer and control operations generated, for example, by one of applications 206 are translated and passed to a virtual machine file system (VMFS) driver 216 that manages access to files (e.g., virtual disks, etc.) stored in data storage systems (such as data storage system 125) that may be accessed by any of the virtual machines 203. In one embodiment, access to DSU 120 is managed by VMFS driver 216 and shared file system 115 for LUN 120 is a virtual machine file system (VMFS) that imposes an organization of the files and directories stored in DSU 120, in a manner understood by VMFS driver 216. For example, guest operating system 208 receives file system calls and performs corresponding command and data transfer operations against virtual disks, such as virtual SCSI devices accessible through HBA emulator 213, that are visible to guest operating system 208. Each such virtual disk may be maintained as a file or set of files stored on VMFS, for example, in DSU 120. The file or set of files may be generally referred to herein as a virtual disk and, in one embodiment, complies with virtual machine disk format specifications promulgated by. VMware (e.g., sometimes referred to as a vmdk files). File system calls received by guest operating system 208 are translated to instructions applicable to particular file in a virtual disk visible to guest operating system 208 (e.g., data block-level instructions for 4 KB data blocks of the virtual disk, etc.) to instructions applicable to a corresponding vmdk file in VMFS (e.g., virtual machine file system data block-level instructions for 1 MB data blocks of the virtual disk) and ultimately to instructions applicable to a DSU exposed by data storage unit 125 that stores the VMFS (e.g., SCSI data sector-level commands). Such translations are performed through a number of component layers of an "IO stack," beginning at guest operating system 208 (which receives the file system calls from applications 206), through host bus emulator 213, VMFS driver 216, a logical volume manager 218 which assists VMFS driver 216 with mapping files stored in VMFS with the DSUs exposed by data storage systems networked through SAN 105, a data access layer 222, including device drivers, and host bus adapters 226 (which, e.g., issues SCSI commands to data storage system 125 to access LUN 120).

In one embodiment, guest operating system 208 further supports the execution of a disk monitor application 207 that monitors the use of data blocks of the guest file system (e.g., by tracking relevant bitmaps and other metadata data structures used by guest file system, etc.) and issues unmap commands (through guest operating system 208) to free data blocks in the virtual disk. The unmap commands may be issued by disk monitor application 207 according to one of several techniques. According to one technique, disk monitor application 207 creates a set of temporary files and causes guest operating system 208 to allocate data blocks for all of these files. Then, disk monitor application 207 calls into the guest operating system 208 to get the locations of the allocated data blocks, issues unmap commands on these locations, and then deletes the temporary files. According to another technique, the file system driver within the guest operating system 208 is modified to issues unmap commands as part of a file system delete operation. Other techniques may be employed if the file system data structures and contents of the data blocks are known. For example, in embodiments where virtual disk 220 is a SCSI-compliant device, disk monitor application 207 may interact with guest operating system 208 to request issuance of SCSI UNMAP commands to virtual disk 220 (e.g., via virtual HBA 212) in order to free certain data blocks that are no longer used by guest file system (e.g., blocks relating to deleted files, etc.). References to data blocks in instructions issued or transmitted by guest operating system 208 to virtual disk 220 are sometimes referred to herein as "logical" data blocks since virtual disk 220 is itself a logical conception (as opposed to physical) that is implemented as a file stored in a remote storage system. It should be recognized that there are various methods to enable disk monitor application 207 to monitor and free logical data blocks of guest file system. For example, in one embodiment, disk monitor application 207 may periodically scan and track relevant bitmaps and other metadata data structures used by guest file system to determine which logical data blocks have been freed and accordingly transmit unmap commands based upon such scanning. In an alternative embodiment, disk monitor application 207 may detect and intercept (e.g., via a file system filter driver or other similar methods) disk operations transmitted by applications 206 or guest operating system 208 to an HBA driver in guest operating system 208 and assess whether such disk operations should trigger disk monitor application 207 to transmit corresponding unmap commands to virtual disk 220 (e.g., file deletion operations, etc.) It should further be recognized that the functionality of disk monitor application 207 may be implemented in alternative embodiments in other levels of the IO stack. For example, while FIG. 2 depicts disk monitor application 207 as a user-level application (e.g., running in the background), alternative embodiments may implement such functionality within the guest operating system 208 (e.g., such as a device driver level component, etc.) or within the various layers of the IO stack of hypervisor 214.

It should be recognized that the various terms, layers and categorizations used to describe the virtualization components in FIG. 2 may be referred to differently without departing from their functionality or the spirit or scope of the invention. For example, virtual machine monitors (VMM) 204 may be considered separate virtualization components between VMs 203 and hypervisor 214 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 210 may be merged with and into VMM 204 such that virtual host bus adapter 212 is removed from FIG. 2 (i.e., since its functionality is effectuated by host bus adapter emulator 213).

Virtual Disk Configured with Sparse Extent

Figure 3A:
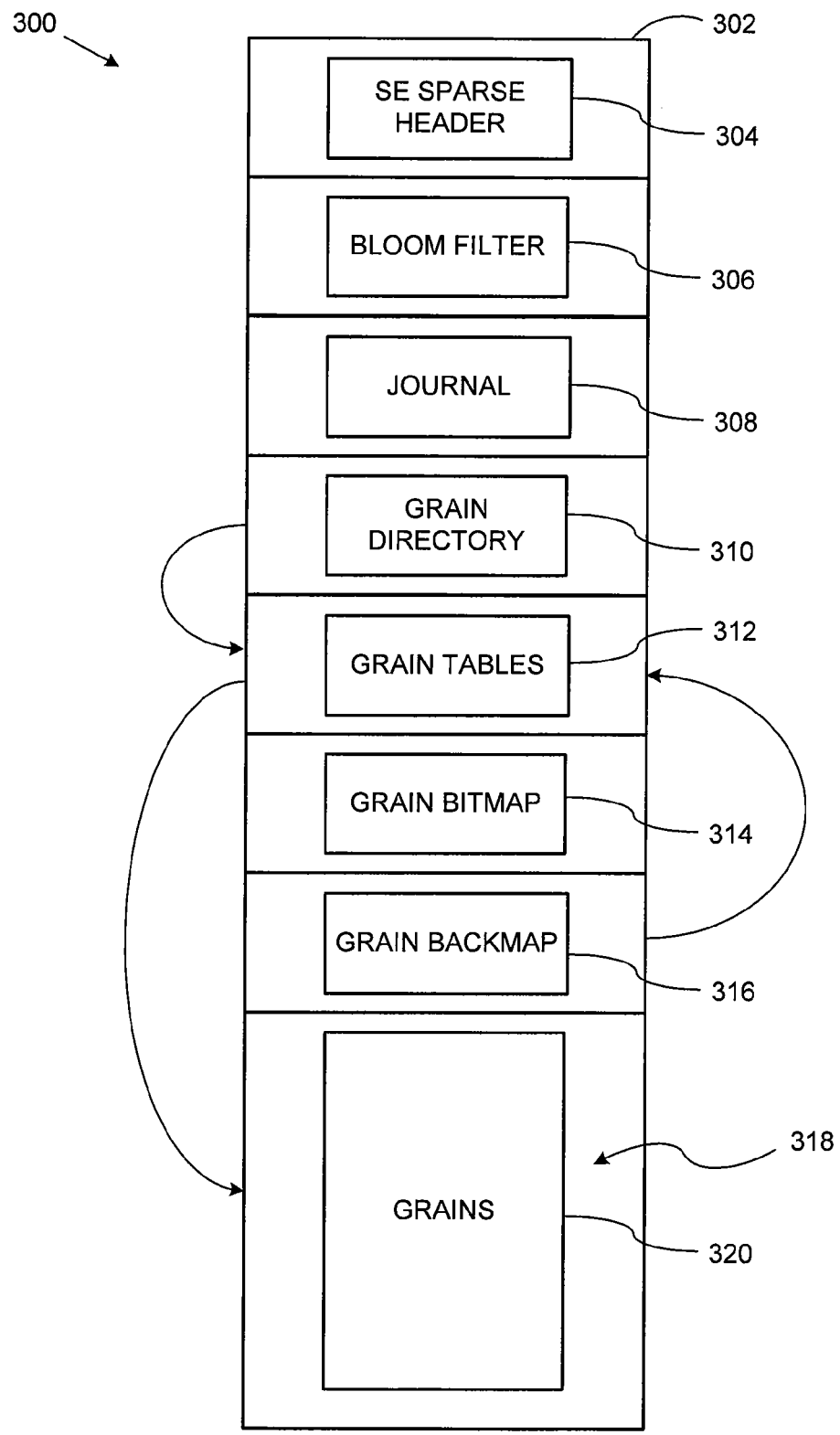
FIG. 3A is a diagram that graphically illustrates a virtual disk format of an exemplary virtual disk, according to an embodiment.

FIG. 3A is a diagram that graphically illustrates a virtual disk format of an exemplary virtual disk, according to an embodiment of the present invention. Virtual disk 220 may be implemented as a space-efficient virtual disk 300 that is thinly provisioned by hypervisor 214. A region of physical storage used by virtual disk 300 that grows over time is referred to herein as a "sparse extent" 302. Although, for exemplary purposes, the various figures and discussions herein depict virtual disk 300 as a single file having a single sparse extent 302, it should be recognized that alternative embodiments may utilize additional files and sparse extents. For example, in one alternative embodiment, virtual disk 300 may comprise a chain of linked files, wherein the first file is referred to as a base disk containing an initial state of virtual disk 300 and each subsequent linked file is referred to as a "delta disk," "delta-link" or "redo log" which each contain changes to virtual disk 300 occurring over time. Each of the base disk and delta disks, in turn, may comprise one or more sparse extents that grow over time (with each such sparse extent also comprising a file itself).

In the embodiment of FIG. 3A, sparse extent 302 of virtual disk 300 includes a plurality of metadata structures that hypervisor 214 uses to manage virtual disk 300. Sparse extent 302 includes a space-efficient sparse header 304, a bloom filter 306, and a journal 308. Sparse header 304 includes information describing configuration and settings of sparse extent 302, such as, for example, the size of a grain (e.g., 4 KBs) which, in one embodiment, may be expressed in sparse header 304 as a multiple (e.g., 8) of the size of a sector (e.g., 512 bytes). Such a grain size may be configured by hypervisor 214 during creation of virtual disk 300 to match the logical data block sizes utilized by the guest file system of the guest operating system 208. Bloom filter 306 is a space-efficient data structure accessed by hypervisor 214, for example, when virtual disk 300 includes additional linked delta disk files. Upon receiving a file read operation, hypervisor 214 may access bloom filter 306 to more efficiently assess whether the file read operation relates to data stored in the base disk (or other "higher-level" delta disks), thereby reducing I/O lookup costs of traversing multiple delta disks to make such determination (although it should be recognized that other space-efficient data structures may be utilized in alternative embodiments). Journal 308 provides a journalled metadata infrastructure for virtual disk 300 in order to store completed "transactions" (e.g., writes to disk, etc.) prior to committing them in order to maintain and recover consistent metadata and data states in shared file system 115 in the event of host or storage system crashes. It should be recognized that various structures in sparse extent 302 such as bloom filter 306 and journal 308 are merely exemplary and that alternative embodiments may not necessarily include such structures. As further discussed below, sparse extent 302 also includes a grain directory 310, one or more grain tables 312, a grain bitmap 314, a grain backmap 316, and a space 318 reserved for storing one or more grains 320.

Figure 3B:
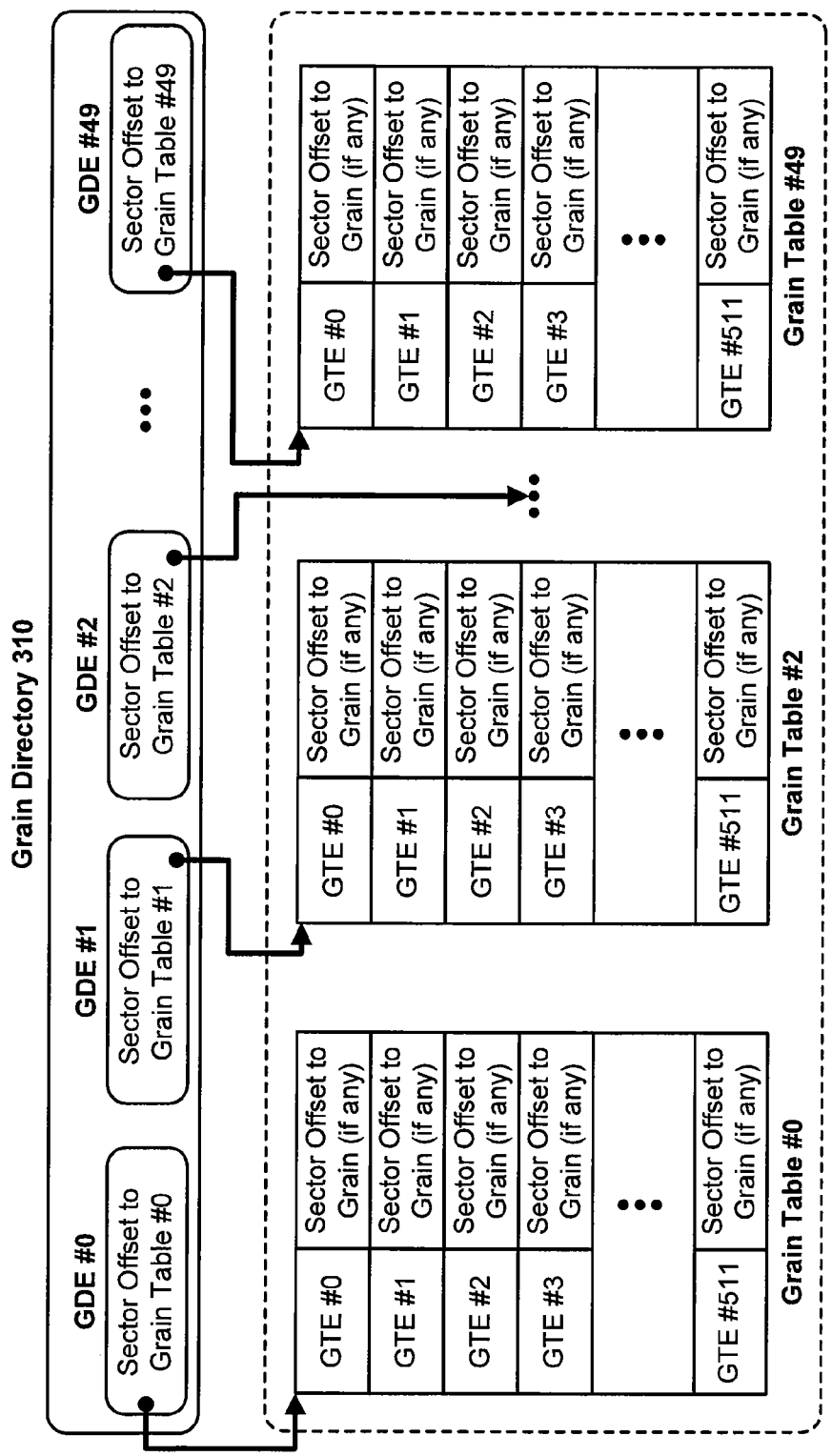
FIG. 3B is a diagram that graphically illustrates a grain directory and grain tables, according to an embodiment.

FIG. 3B is a diagram that graphically illustrates a grain directory and grain tables, according to an embodiment. When a request to access a particular logical data block of virtual disk 300 is made, hypervisor 214 is able to access grain directory 310 and grain tables 312 to determine which grain (if any) in space 318 corresponds to such a logical data block. Grain directory 310 subdivides the logical data blocks available in virtual disk 300 (e.g., in sparse extent 302) such that each grain directory entry (GDE) represents a contiguous portion of logical data blocks of virtual disk 300. In particular, each GDE itself comprises a reference (e.g., an offset in sectors in the virtual disk) to one of grain tables 312. Each entry in a grain table, referred to as a grain table entry (GTE), also comprises a reference (e.g., an offset in sectors in the virtual disk) to a grain allocated in space 318. In the embodiment of FIG. 3B, for example, each grain table 312 comprises 512 GTEs and each GTE references a grain of 4 KBs (i.e., 1 logical data block in the guest file system) such that each GDE provides access to a 2 MB portion of contiguous logical data blocks available in virtual disk 300 (i.e., number of entries (512)*grain size (4 KB)=2 MBs). If, in such an embodiment, sparse extent 302 was initially created to provide virtual disk 300 with 100 MBs of storage space, then grain directory 310 is initialized to include 50 GDEs (i.e., 100 MBs/2 MBs). In such an embodiment, hypervisor 214 can traverse grain directory 310 and grain tables 312 to determine a grain in sparse extent 302 that corresponds to, for example, logical data block 50 in the 100 MBs of virtual disk 300. Specifically, hypervisor 214 determines that the first GDE of grain directory 310, namely, GDE 0, references the appropriate grain table by calculating the following: $50^{th}$ logical data block of 100 MBs of data/512 logical data blocks accessible per GDE=$0^{th}$ GDE. Hypervisor 214 then accesses the grain table referenced in GDE 0 and determines that the $50^{th}$ GTE of the referenced grain table should contain a reference to a grain in space 318 that corresponds to the $50^{th}$ logical data block of virtual disk 300 (i.e., by calculating the following: $50^{th}$ logical data block of 100 MBs of data % 512 contiguous logical data blocks accessible in GDE 0)=$50^{th}$ GTE). Furthermore, if the value of the $50^{th}$ GTE is 0 (or any other similar unique identifier), then a grain has not yet been allocated for the $50^{th}$ logical data block of the 100 MBs of available data in sparse extent 302 for virtual disk 300 (e.g., and hypervisor 512 can allocate a grain in space 318 at that time, if needed, such as for a write operation to the $50^{th}$ logical data block). As such, it should be recognized that when sparse extent 302 is initially created in such an embodiment, all grain tables are initialized to 0 (or any other similar unique identifier) meaning that a grain has not yet been allocated to any logical data blocks of virtual disk 300 and once a grain is allocated from space 318, the corresponding grain table entry is set with an offset of sectors to the grain in sparse extent 302. It should further be recognized that alternative embodiments may not necessarily utilize a grain directory to provide an initial subdivision of the storage space available in sparse extent 302 but rather rely solely on grain tables (which may have entries of arbitrary size, versus a fixed length of 512 entries as discussed herein).

In some embodiments, some GDEs may have SPARSE/NULL entries and may not hold a valid grain table pointer. In addition, it should be recognized that the GDEs of grain directory 310 may not necessarily point to grain tables having monotonically increasing grain table numbers.

As discussed above, because virtual disk 300 is created with "sparse" extent 302, it is thinly provisioned such that grains are not initially allocated to the virtual disk (e.g., vmdk file) during initial creation but are allocated only when additional storage space is needed by the virtual disk. In one embodiment, grain tables 312 may be further configured to reduce or eliminate storage of "zero blocks" (e.g., data blocks having no data) in the virtual disk 300. Guest operating system 208 may request a zero block, for example, by requesting that a logical data block be zeroed out (i.e., zeroes written into the data block) for security purposes, prior to re-allocating the data block to a file in virtual disk 300. In such an embodiment, instead of allocating a grain that will store only zeroes for the logical data block, hypervisor 214 may alternatively store, within the GTE corresponding to the logical data block, a specific value or identifier representing the zero block (referred to as a "sentinel" value). When guest operating system 208 requests a read operation on the logical data block, hypervisor 214 looks up the GTE corresponding to the logical data block, recognizes the sentinel value stored in the GTE and accordingly, returns zero block data to guest operating system 208. As such, less disk storage is used by not having to actually store the zero blocks. The sentinel value may be a pre-determined unique value stored in a grain table entry 404 and reserved for use by the hypervisor 214, although it should be recognized that the sentinel value may be implemented in a variety of alternative ways. It should further be recognized that the foregoing sentinel value technique for reducing storage for zero blocks may be extended to any common data pattern that may repetitively occur. In one embodiment, hypervisor 214 may be configured to recognize any pre-determined data block pattern and set sentinel values in GTEs accordingly. For example, hypervisor 214 may be configured to include a pattern library having a plurality of pre-determined patterns that are mapped to with corresponding sentinel values. In such an embodiment, when hypervisor 214 detects a pre-determined pattern in a virtual disk operation, hypervisor 214 may reference the pattern library and store the determined sentinel value in a GTE rather than allocate a new grain for the virtual disk operation. Likewise, for a read operation to a block whose GTE points to a sentinel value, hypervisor 214 copies the pre-determined pattern corresponding to the sentinel value to the memory location associated with the read operation.

Furthermore, grain tables 312 themselves may also be allocated in a space efficient manner during creation of virtual disk 300. In one implementation, upon creation of virtual disk 300, hypervisor 214 may logically pre-allocate space for grain tables 312 within the sparse extent 302. As such, grain tables 312 will be located at predefined logical file offsets within the sparse extent 302. This approach reduces a false-sharing effect that may occur between the grain tables 312 and grains 320. According to another implementation, the hypervisor 214 may allocate space for the grain tables 312 such that the footprint size of a cluster of grain tables 312 is a multiple of the underlying lower level storage system's block size. This approach decreases the amount of unused space that may otherwise be allocated for a cluster of grain tables in case where the cluster straddles across the underlying file system's file block boundaries. According to yet another implementation, the hypervisor 214 may use a lazy-zero method to allocate regions of space for the grain tables 312. Allocating grain tables 312 may generally result in a thin-provisioned expansion of the sparse extent 302. Rather than relying on a delta disk driver to zero out to-be-used metadata regions within the sparse extent 302, the hypervisor 214 may instead rely on a lazy zeroing process, as employed in VMFS, to perform zeroing of the metadata regions.

Figure 3C:
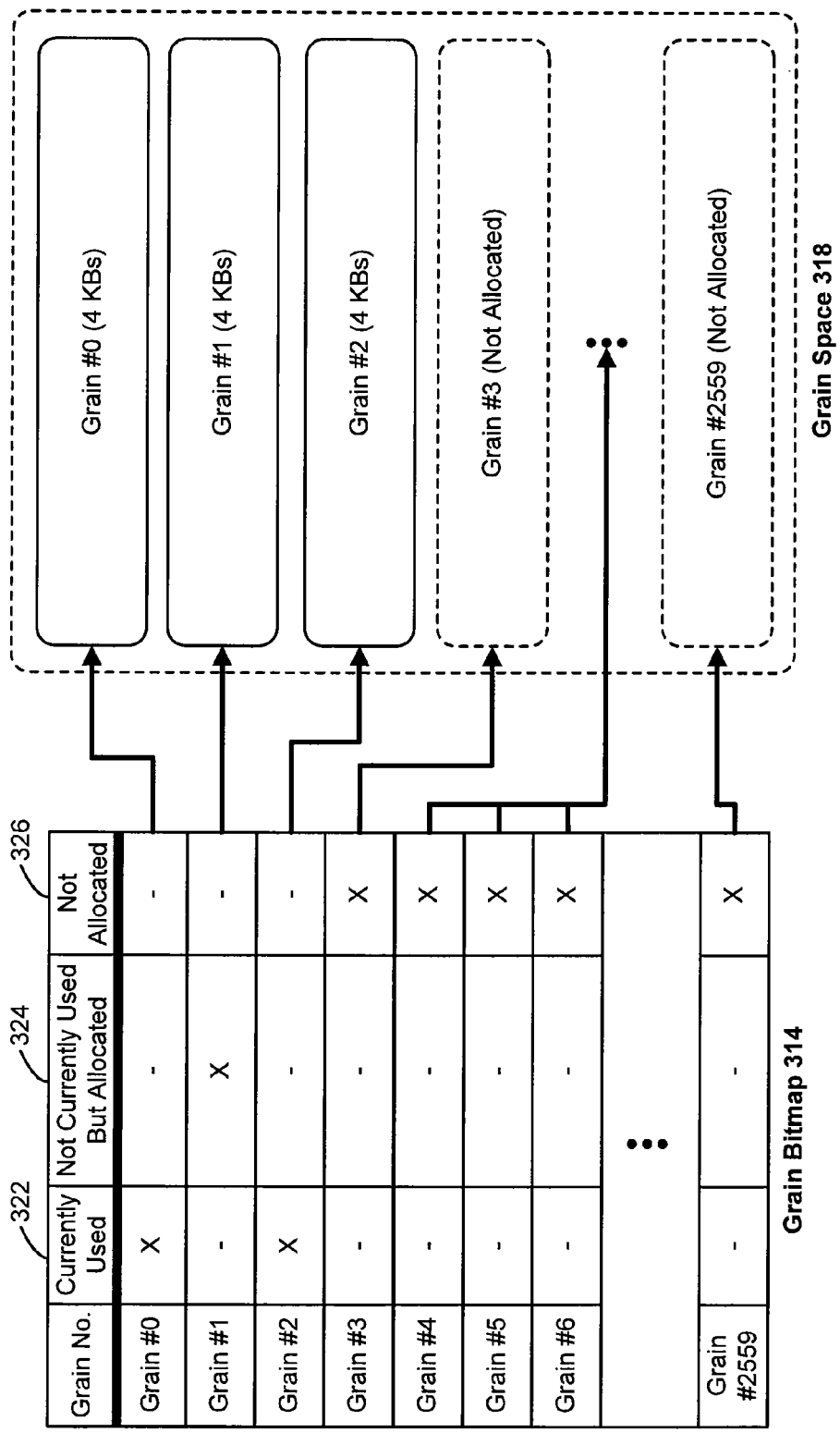
FIG. 3C is a diagram that graphically illustrates a grain bitmap, according to an embodiment.

FIG. 3C is a diagram that graphically illustrates a grain bitmap, according to an embodiment. Grain bitmap 314 tracks usage of grains in sparse extent 302 and enables hypervisor 214 to selectively choose particular grains when hypervisor 214 needs to allocate a grain for a logical data block of virtual disk 300 (as further discussed below). In the embodiment of FIG. 3C, grain bitmap 314 includes a plurality of bitmap entries, wherein each bitmap entry corresponds to a grain that is available in sparse extent 302, regardless of whether physical storage space has actually been allocated by the remote storage system for such a grain. In the embodiment of FIG. 3C, each bitmap entry provides an identification of an available grain in space 318 and an indication (see indicators 322, 324 and 326) as to whether the corresponding grain: (i) is currently being used to store data, (ii) is currently unused but has been previously allocated (e.g., was used to store data at some point but is no longer in used), or (iii) has not been allocated (e.g., has not been used by the virtual disk or has been de-allocated as further discussed below). As depicted in FIG. 3C, for example, grain bitmap 314 has 2560 entries, reflecting that sparse extent 302 was initially created to provide virtual disk 300 with 10 MBs of data (e.g., since each grain comprises 4 KBs of data), although 10 MBs are not immediately allocated to virtual disk 300 due to thin provisioning. Grain bitmap 314 illustrates that only three grains of the virtual disk, grain #0, grain #1 and grain #2, are currently allocated, indicating that the size of the data portion (i.e., space 318) of the virtual disk for virtual disk 300 is 12 KBs. Although grain bitmap 314 includes entries for the remaining grains (i.e., grains #4-#2259), such entries do not actually have a corresponding grain in space 318 of the virtual disk. Furthermore, grain bitmap 314 indicates that grain #1 is no longer being used. The status of a grain such as grain #1 can change from currently used (e.g., indicator 322) to unused (e.g., indicator 324), for example, if a file in the guest file system having a logical data block that corresponds to data in grain #1 is deleted and disk monitor application 207 correspondingly transmits an unmap command to guest operating system 208 to unmap the logical data block, as further discussed herein in the context of FIG. 5. Similarly, as further discussed in the context of FIG. 4A, hypervisor 214 may traverse grain bitmap 314 to select a more "desirable" grain to store data, for example, upon receiving a write operation to a logical data block from guest operating system 208. As further discussed in the context of FIG. 6, hypervisor 214 may also traverse grain bitmap 314 to "collocate" unused grains to the end of the virtual disk in an effort to defragment and truncate the virtual disk, for example, by releasing certain sectors back to the remote storage system that correspond to unused collocated grains after such defragmentation (e.g., via sector-level unmap commands to the remote storage system). In addition, the status of a grain may change from currently used (e.g., indicator 322) to not allocated (e.g., indicator 326), if an application inside VM 203 overwrites an entire logical data block with zeroes.

It should be recognized that grain bitmap 314 may be utilized by hypervisor 214 for other reasons as well. For example, hypervisor 214 may traverse grain bitmap 314 to monitor and report the amount of space-savings within virtual disk 300 without having to perform an exhaustive scan (i.e., introspection) of the virtual disk contents, relying instead on information in grain bitmap 314 about the amount of grains being used and/or allocated by guest operating system 208 compared to the total number of grains available in the virtual disk 300 upon its creation. In addition, grain bitmap 314 may be consulted to reduce network bandwidth and other costs when migrating space-efficient virtual disk 300 from one host to another host, because data blocks that are not allocated do not need to be copied.

It should be recognized that although grain bitmap 314 has been referred to as a "bitmap," such a term should be construed broadly to mean any data structure that can maintain the information depicted in FIG. 3C regarding each grain in space 318. Furthermore, alternative embodiments may utilize grain bitmaps that track less or more information relating to grains in space 318 depending upon the levels of space efficiency desired in such embodiments. In one such alternative embodiment, each bitmap entry of grain bitmap 314 provides an identification of an available grain in space 318 and an indication as to whether the corresponding grain: (i) is currently being used to store data, or (ii) is not used (regardless of whether it has been allocated or not). The information as to whether a grain is currently unused but previously allocated may be derived by checking if the grain has a sector offset that is less than the current file length.

Figure 3D:
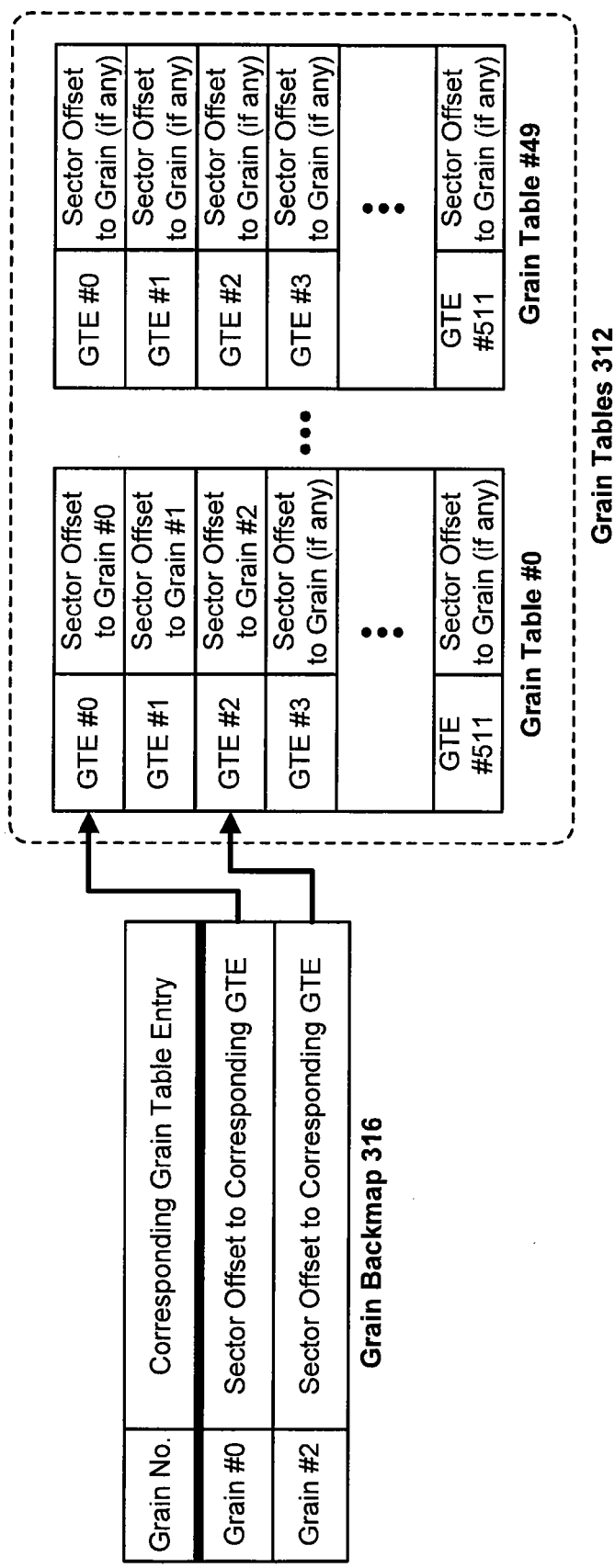
FIG. 3D is a diagram that graphically illustrates a grain backmap, according to an embodiment.

FIG. 3D is a diagram that graphically illustrates a grain backmap, according to an embodiment. Grain backmap 316 enables hypervisor 214 to identify a GTE corresponding to a grain in space 318. As further discussed in the context of FIG. 6, grain backmap 316 assists hypervisor 214 in defragmenting virtual disk 300 by collocating unused grains towards the end of the virtual disk so that a truncation (e.g., unmap commands issued by hypervisor 214 to the remote storage system) of the virtual disk may reclaim storage space. As depicted in the embodiment of FIG. 3D, grain backmap 316 comprises a plurality of backmap entries corresponding to each grain in space 318 that is currently in use (e.g., indicator 322 in grain bitmap 314) by the guest file system (e.g., grains in space 318 that are allocated but unused do not have a backmap entry in the embodiment of FIG. 3D, although alternative embodiments may maintain an entry for such unused grains as well). In one embodiment, grain backmap 316 provides a backmap entry for every grain that is possible, and is thin-provisioned so that only the grains that are allocated have a valid backmap entries and all other backmap entries are invalid. Each backmap entry comprises an identification of the grain (e.g., grain number, sector offset of grain in virtual disk 300, etc.) and a corresponding identification (e.g., sector offset, etc.) of a GTE in grain tables 312 that includes a reference (e.g., sector offset, etc.) back to the grain. FIG. 3D depicts a simple version of a grain backmap 316, consistent with grain bitmap 314 in FIG. 3C. As depicted, grain #0 and grain #2 have entries in grain backmap 316 consistent with the indicators in grain bitmap 314 that such grains are currently in use by the guest file system. Grain #1, however, does not have an entry in grain backmap 316, consistent with the indicator in grain bitmap 314 that it is not currently in use by the guest file system. Although grain backmap 316 is depicted as a lookup table in FIG. 3D, it should be recognized that any suitable data structure may be utilized to provide a one-to-one mapping between a grain that is in use and a GTE pointing to that grain. It should be further recognized that alternative embodiments may implement grain bitmap 314 and grain backmap 316 as a combined data structure.

Figure 4A:
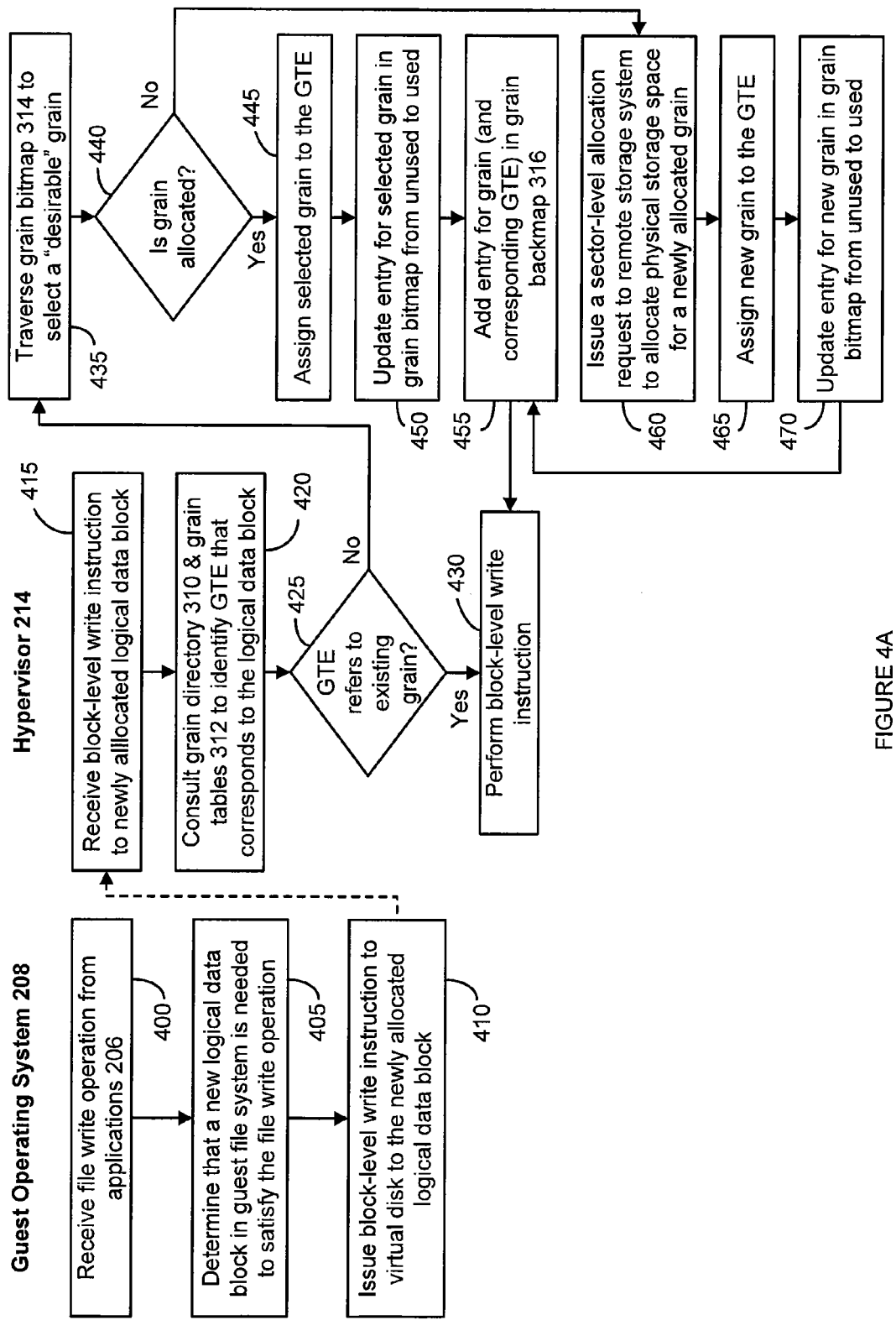
FIG. 4A is a flow diagram of method steps for performing a write operation according to an embodiment, according to an embodiment.

FIG. 4A illustrates a method for performing a write operation according to an embodiment. In particular, the various grain data structures described herein (grain tables, grain bitmap, grain backmap, etc.) are atomically updated during typical write operations that are performed by virtual machine 208 during the course of execution.

In step 400, guest operating system 208 receives a write operation from one of applications 206. For example, such an application may request that data be written to a file residing on virtual disk 300. Upon receipt of the write operation, guest operating system 208 may access metadata data structures of the guest file system to determine whether a new data block needs to be allocated for the write operation. For example, guest operating system 208 may first access a file descriptor (e.g., inode, etc.) stored in guest file system for the file relating to the write operation and, based upon data block information therein, conclude, in step 405, that the file requires allocation of a new logical data block in the guest file system. Guest operating system 208 may then consult a data block bitmap (or other similar data structure) maintained by guest file system, select a free data block based on the bitmap (e.g., marking the bit entry in bitmap) and update the file descriptor for the file accordingly to indicate that the selected data block has been allocated to the file. In step 410, guest operating system 208 then issues to virtual disk 300 a block-level write instruction directed towards the newly allocated logical data block.

In step 415, hypervisor 214 (via HBA emulator 213, for example) receives the block-level write instruction and, in step 420, consults grain directory 310 and grain tables 312 to identify the GTE that corresponds to the logical data block. It should be recognized that in order to access grain directory 310 and grain tables 312 stored in the virtual disk in step 420, in one embodiment, hypervisor 214 first accesses a file descriptor (e.g., inode, etc.) maintained by the virtual machine file system (e.g., VMFS) for the file representing the virtual disk, thereby obtaining access to references of virtual machine file system data blocks (e.g., of 1 MB block size) in the virtual machine file system that store the contents of the virtual disk (i.e., including the virtual machine file system data blocks storing grain directory 310 and grain tables 312). If, in step 425, the GTE includes a reference (e.g., sector offset) to an existing grain, in step 430, hypervisor 214 performs the requested block-level write instruction into the grain (e.g., by translating the sector offset to the grain to an offset into a corresponding virtual machine file system data block and ultimately into a corresponding sector-level write instruction through the IO stack of hypervisor 214 and issuing the corresponding sector-level write instruction to the remote storage system).

If, in step 425, the GTE indicates that no grain is currently allocated for the logical data block, in step 435, hypervisor 214 traverses grain bitmap 314 to select a "desirable" grain. In one embodiment, a desirable grain is a grain that is located proximate to other grains that are currently in use by guest operating system 208 such that the spatial locality of currently used grains in space 318 is maintained or otherwise improved. For example, in the embodiments reflected in FIGS. 3C and 3D, grain #1 is a desirable grain because it is located proximate to grain #0 and grain #2, both which are currently in use. In another embodiment, the "desirable" grain is selected so that the spatial locality of the block address space of the virtual disk is maintained or otherwise improved. If it is determined in step 440 that the selected grain is allocated (i.e., the grain maps to a file offset that is less than the current file length), then steps 445, 450 and 455 are carried out in an atomic manner. In step 445, hypervisor 214 assigns the grain to the GTE, and, in step 450, updates the entry for the grain in grain bitmap 314 from currently unused to currently used. In step 455, hypervisor 214 also adds an entry for the grain (and corresponding GTE) in grain backmap 316 before returning to step 430 to perform the block-level write instruction into the grain. If, however, in step 440, the selected grain is not allocated, then steps 460, 465, 470, and 455 are carried out in an atomic manner. In step 460, hypervisor 214 allocates additional space from the virtual machine file system to accommodate a new grain in the virtual disk. For example, hypervisor 214 may access a virtual machine file system free data block bitmap data structure maintained by the virtual machine file system to select a free virtual machine file system data block (e.g., of 1 MB size) to allocate to the virtual disk and accordingly update the file descriptor of the virtual disk to include a reference to the newly allocated virtual machine file system data block (e.g., extending the current size of the virtual disk by 1 MB). If a virtual machine file system data block of 1 MB is allocated to the virtual disk, then a total of 256 (1 MB/4 KB) new grains, including the desirable grain of step 435, are available in the virtual disk. Once the new grains have been allocated, in step 465, hypervisor 214 assigns the desirable grain to the GTE, and, in step 470, updates the entry for the grain in grain bitmap 314 from unused to used. Hypervisor 214 then returns to step 455, and adds an entry for the grain (and corresponding GTE) in grain backmap 316 before returning to step 430 to perform the block-level write instruction into the newly allocated grain.

Figure 4B:
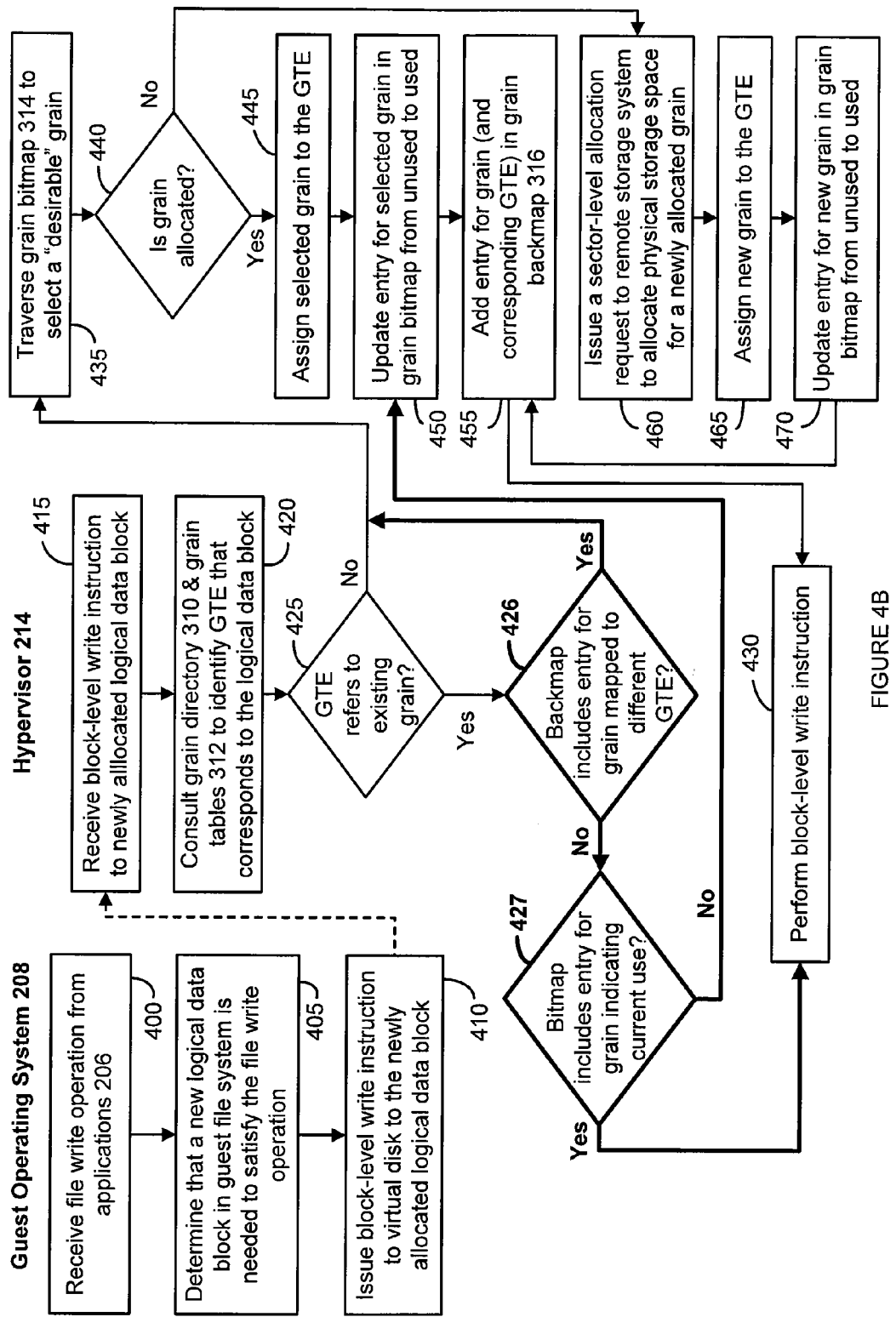
FIG. 4B is a flow diagram of alternative method steps for performing a write operation according to an embodiment, according to an alternative embodiment.

It should be recognized that in certain instances, guest operating system 208 may transmit a block-level write instruction to hypervisor 214 to write one or more zero blocks to a virtual disk 300 (e.g., to zero out blocks for security reasons prior to allocating them to a different file in the guest file system). In such instances, for certain embodiments, hypervisor 214 may then modify the GTE identified in step 420 to contain a sentinel value denoting a zero block. In one such embodiment, any pre-existing allocated grain mapped to such GTE is marked as currently unused in grain bitmap 314 and any corresponding entry for the grain in grain backmap 316 is removed. It should be further recognized that the flow of the method depicted in FIG. 4 is merely exemplary and alternatives may modify such the flow of the method without departing from the spirit of teachings herein.

Figure 4C:
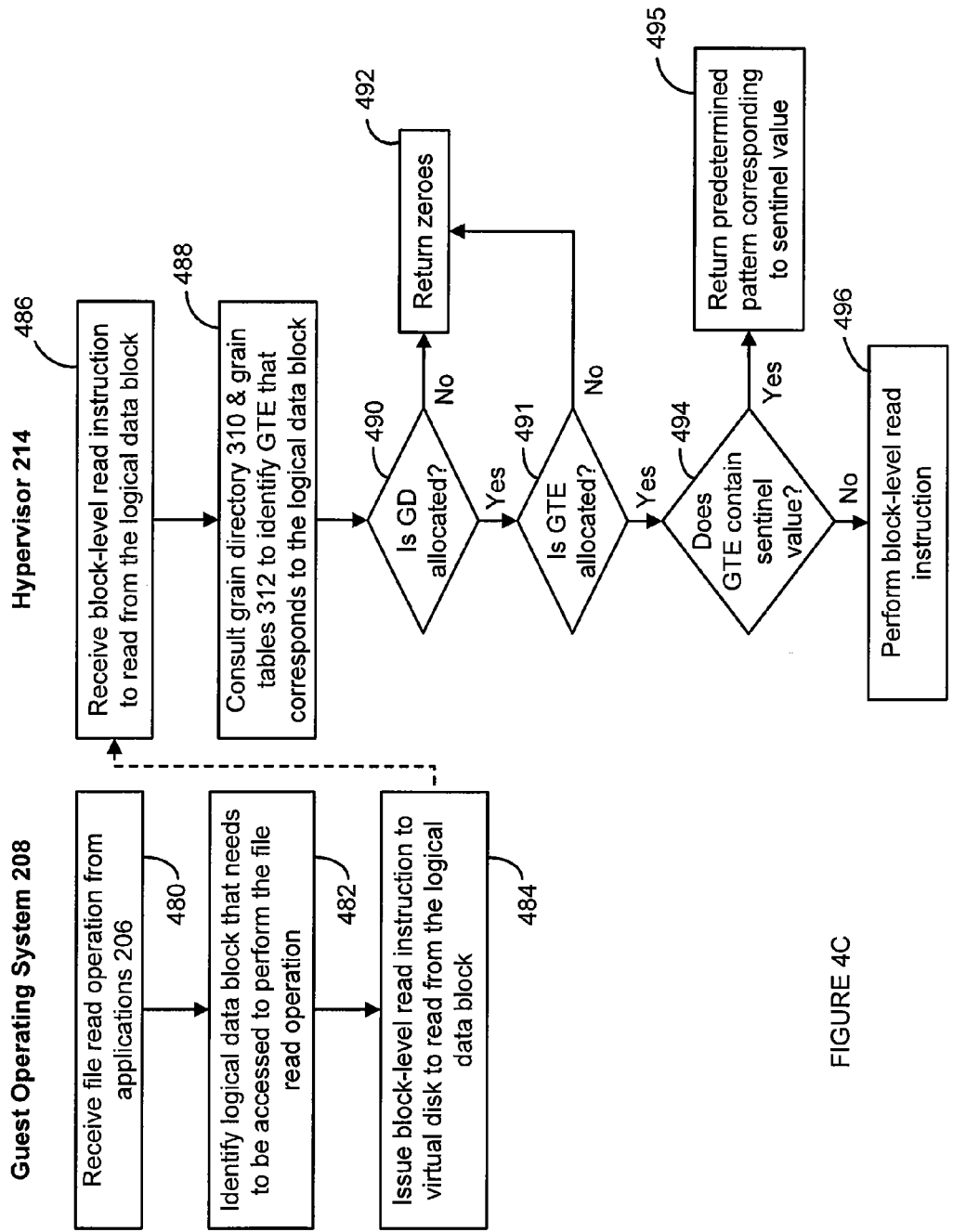
FIG. 4C is a flow diagram of method step for performing a read operation according to an embodiment, according to an embodiment.

FIG. 4C illustrates a method for performing a read operation according to an embodiment. In step 480, guest operating system 208 receives a read operation from one of applications 206. For example, such an application may request that data be read from a file residing on virtual disk 300. Upon receipt of the read operation, guest operating system 208 may access metadata data structures of the guest file system, such as a file descriptor (e.g., inode, etc.) stored in the guest file system for the file relating to the read operation to identify a logical data block that needs to be accessed to perform the read operation (step 482). In step 484, guest operating system 208 issues to virtual disk 300 a block-level read instruction to read from the logical data block.

In step 486, hypervisor 214 (via HBA emulator 213, for example) receives the block-level read instruction and, in step 488, consults grain directory 310 and grain tables 312 to identify the GTE that corresponds to the logical data block. It should be recognized that in order to access grain directory 310 and grain tables 312 stored in the virtual disk in step 488, in one embodiment, hypervisor 214 first accesses a file descriptor (e.g., inode, etc.) maintained by the virtual machine file system (e.g., VMFS) for the file representing the virtual disk, thereby obtaining access to references of virtual machine file system data blocks (e.g., of 1 MB block size) in the virtual machine file system that store the contents of the virtual disk (i.e., including the virtual machine file system data blocks storing grain directory 310 and grain tables 312).

In step 490, hypervisor 214 determines if a GDE is allocated for the logical data block and, in step 491, hypervisor 214 determines if a GTE is allocated for the logical data block. If either the GDE or the GTE is not allocated for the logical data block, zeroes are returned to the application in step 492. If both the GDE and the GTE are allocated for the logical data block, step 494 is executed. In step 494, the GTE is examined for a sentinel value. If the GTE contains a sentinel value, the predetermined pattern corresponding to the sentinel value is returned to the application in step 495. If not, in step 496, hypervisor 214 performs the requested block-level read instruction into the grain (e.g., by translating the sector offset to the grain to an offset into a corresponding virtual machine file system data block and ultimately into a corresponding sector-level read instruction through the IO stack of hypervisor 214 and issuing the corresponding sector-level read instruction to the remote storage system).

In-Place Snapshots using a Virtual Disk Configured with Sparse Extent

Figure 5A:
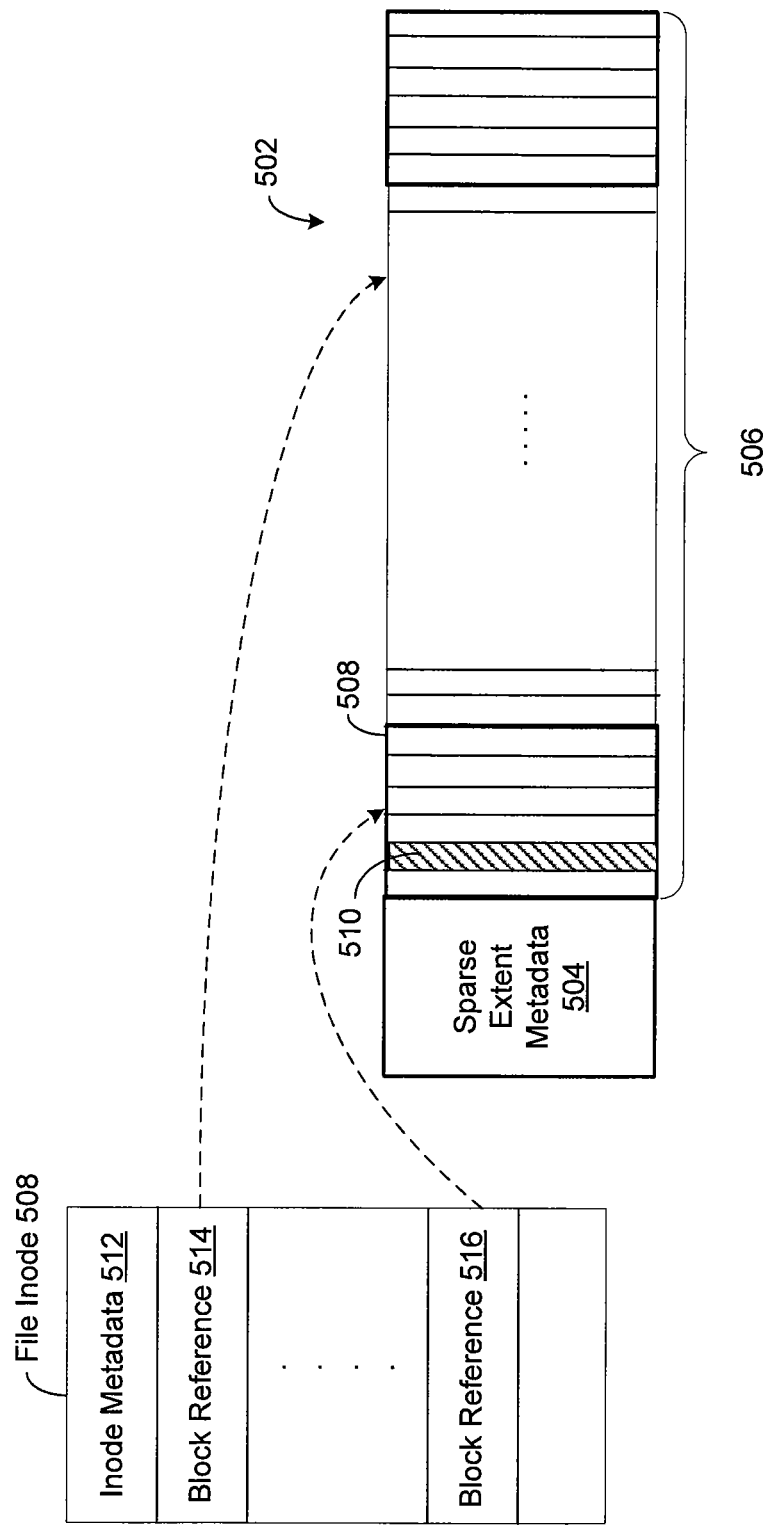
FIG. 5A illustrates a file inode associated with a virtual disk.

FIG. 5A illustrates a file inode 508 associated with a virtual disk 502. Virtual disk 502 is created with a sparse extent and is thinly provisioned by hypervisor 214. As discussed above, virtual disk 502 is represented within file system 115 as a file having multiple logical data blocks. For example, as previously discussed, such logical data blocks for a file system 115 such as a virtual machine file system (VMFS) may each be 1 MB in size.

Virtual disk 502 includes sparse extent metadata 504 (e.g., components 304-316 of FIG. 3A in one embodiment) and grain space 506 reserved for storing one or more grains, such as grain 510. Virtual disk 502 is organized as a set of logical data blocks (e.g., 1 MB in certain embodiments) of file system 115, where each data block within grain space 506 includes multiple grains (as previously discussed, such grains themselves may be equivalent in size, e.g., 4 KB to logical data blocks used by the guest file system in guest OS 208 of a VM 203 that accesses virtual disk 502). For example, data block 508 (shown in bold) in virtual disk 502 includes multiple grains, including grain 510. Since virtual disk 502 is thinly provisioned, grain space 506 grows over time as physical storage is allocated to process requests received from one or more VMs 203 served by virtual disk 502.

Each of the VMs 203 may share data blocks included in virtual disk 502. For example, when clone VMs 203 are generated from a parent VM 203 in a linked clone environment, then the data blocks included in virtual disk 502 originally being accessed by the parent VM 203 are shared by the clone VMs 203. To track the number of VMs 203 sharing blocks of virtual disk 502, hypervisor 214 maintains a reference count for each data block of virtual disk 502. For a particular data block, the reference count indicates the number of VMs 203 that share the data block. In one embodiment, the reference count for a particular data block is stored within the data block itself. A reference count for a free data block is 0, and changed to 1 when the data block is first written.

Figure 5B:
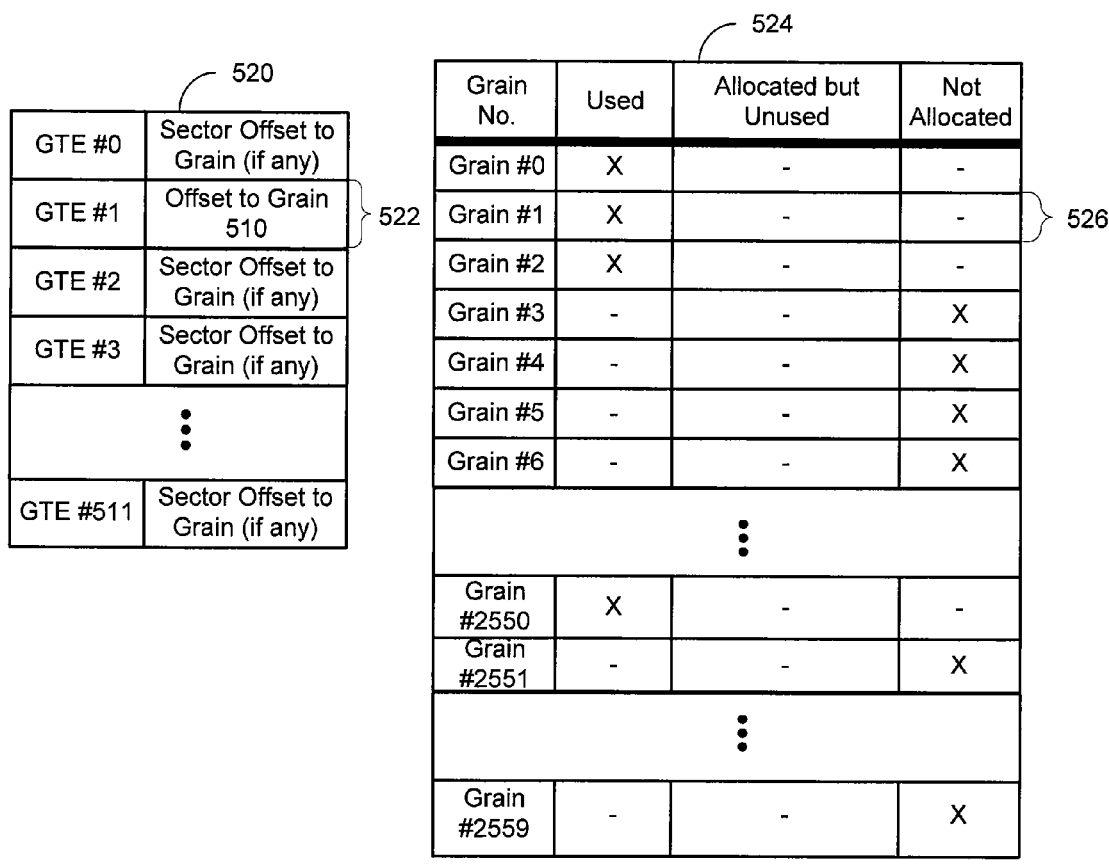
FIG. 5B illustrates a detailed view of a grain table and a grain bitmap included in sparse extent metadata.

Each time a VM 203 accesses a particular data block that was previously written, i.e., has a reference count greater than zero, hypervisor 214 increments the reference count associated with the data block by one. Thus, a data block that has a reference count greater than one indicates that multiple VMs 203 share the data block. In such a scenario, hypervisor 214 should manage a write request transmitted by one VM 203 for writing to a particular grain within the data block such that only the VM 203 that transmitted the write request is able to access the newly written data. The remaining VMs 203 sharing the data block should be able to access the data that was originally in the grain Sparse extent metadata 504 comprises metadata structures used by hypervisor 214 to manage virtual disk 502. More specifically, as previously discussed in FIG. 3A, certain embodiments of sparse extent metadata 504 may include a space-efficient sparse header, a bloom filter, a journal, a grain directory, one or more grain tables, a grain bitmap and a grain backmap. FIG. 5B, discussed below, illustrates a detailed view of a grain table 520 and a grain bitmap 524 included in sparse extent metadata 504. The remaining metadata structures included in sparse extent metadata 504 and the hypervisor's use thereof are described in detail above in conjunction with FIGS. 3A-3D.

Referring to FIG. 5B, grain table 520 includes a set of grain table entries, where each grain table entry (GTE) includes a reference to a grain allocated in grain space 506. For example, GTE 522 includes a reference to grain 510. In one embodiment, a reference to a grain is an offset within a particular data block of virtual disk 502. Grain bitmap 524 tracks usage of grains in virtual disk 502 and enables hypervisor 214 to selectively choose particular grains when hypervisor 214 needs to allocate a grain for a logical data block of virtual disk 502. In the embodiment of FIG. 5B, grain bitmap 524 includes a plurality of bitmap entries, such as bitmap entry 526, where each bitmap entry corresponds to a grain that is available in virtual disk 502. Each bitmap entry provides an identification of an available grain in grain space 506 and an indication as to whether the corresponding grain: (i) is currently being used to store data, (ii) is currently unused but has been previously allocated (e.g., was used to store data at some point but is no longer in used), or (iii) has not been allocated (e.g., has not been used by the virtual disk or has been de-allocated). For example, bitmap entry 526 corresponds to grain 510 and indicates that grain 510 is currently being used to store data.

Referring back to FIG. 5A now, a particular VM 203 served by virtual disk 502 accesses virtual disk 502 via file inode 508. File inode 508 includes inode metadata 512 stores attributes associated with virtual disk 502, such as the size of virtual disk 502, the size and the number of data blocks included in virtual disk 502, etc. In addition, file inode 508 includes a set of block references, such as block reference 514 and block reference 516. Each non-empty block reference corresponds to a particular portion (e.g., 1 MB block in certain embodiments) of virtual disk 502 and includes the address of the particular data block in virtual disk 502 storing that portion of virtual disk 502. For example, block reference 514 corresponds to portion A (e.g., 1 MB portion) of virtual disk 502 and includes the address of a data block of virtual disk 502, which stores portion A. Similarly, block reference 516 corresponds to portion B (e.g., 1 MB portion) of virtual disk 502 and includes the address of data block 508, which stores portion B.

Figure 6A:
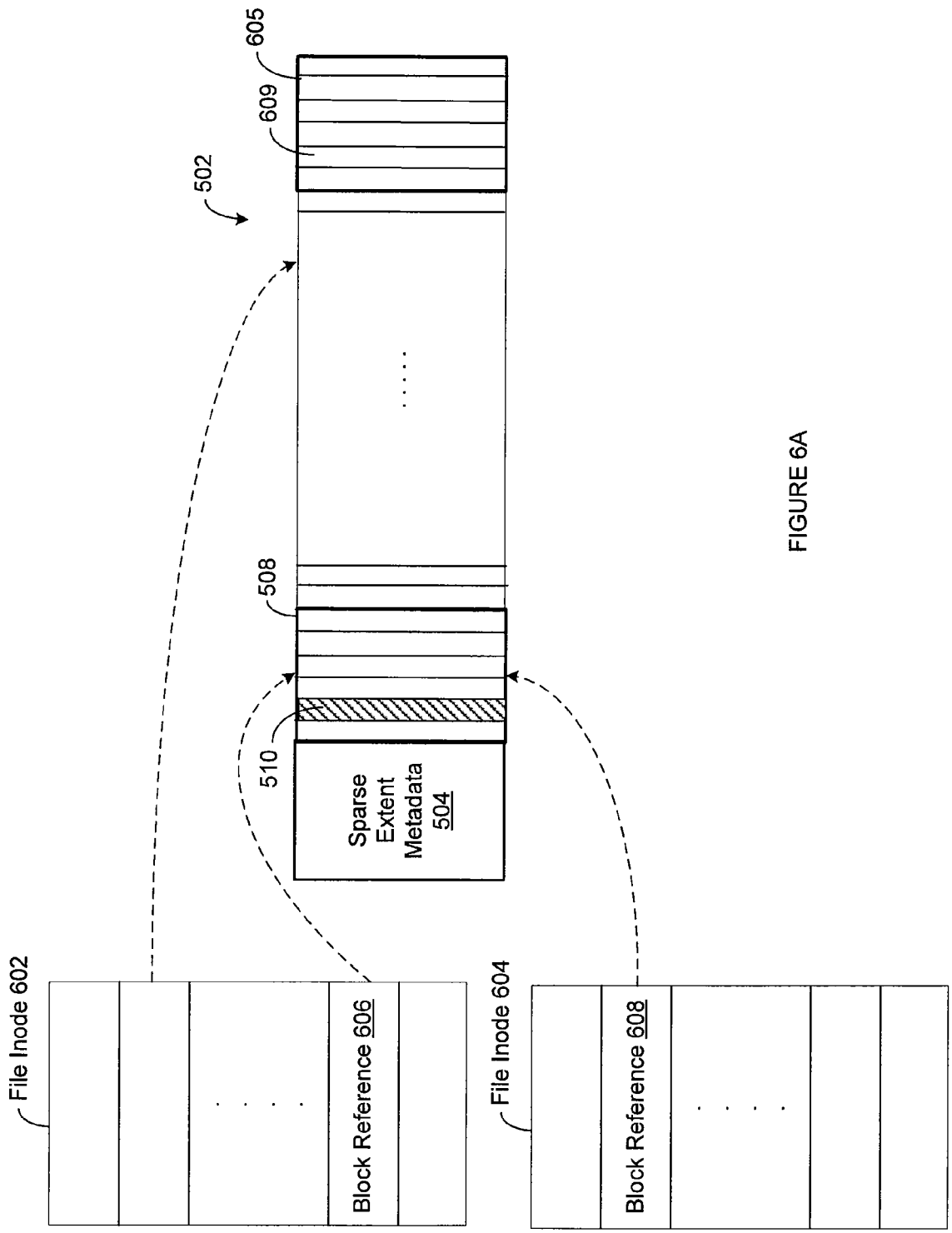
FIG. 6A illustrates data block of virtual disk being shared by two VMs of FIG. 2.

FIG. 6A illustrates data block 508 of virtual disk 502 being shared by two VMs 203 of FIG. 2. A first VM 203 accesses data block 508 via block reference 606 in file inode 602 and a second VM 203 accesses data block 508 via block reference 608 in file inode 604 Because data block 508 is being shared by two VMs 203, the reference count for data block 508 is two. As discussed above, hypervisor 214 maintains the reference count for each data block and increments the reference count for a particular data block when a new VM accesses the data block. In one embodiment, the reference for a particular data block is stored within the data block itself.

Each of the VMs 203 sharing data block 508 may transmit to the hypervisor 214 read requests associated with locations within data block 508. In response, hypervisor 214 first determines the particular grain associated with the read request using the grain address resolution techniques described above. Hypervisor 214 then transmits the data included in the particular grain to the VM 203 that transmitted the read request. Each of the VMs 203 sharing data block 508 may also transmit to the hypervisor 214 write requests associated with locations within data block 508. However, because grains included in a shared data block cannot be written, hypervisor 214 implements an "in-place snapshot" technique described below to capture the write data.

As further described herein, an "in-place snapshot" enables an administrator to snapshot or preserve the state of a virtual disk while still using the current sparse extent (e.g., base disk or delta disk as the case may be, etc.), thereby obviating a need to create a separate linked delta disk or sparse extent to preserve the current sparse extent in a "read-only" state as a snapshot as is typically done. In particular, hypervisor 214 is able to service a write request associated with a location within a shared data block without copying the entire shared data block into a new data block of a delta disk (and then writing the request into the new data block of the delta disk). For in-place snapshots, hypervisor 214 instead stores write data associated with locations within the shared data block within the same virtual disk that includes the shared data block. More specifically, hypervisor 214 causes the virtual disk that includes the shared data block (e.g., data blocks of the "in-place snapshot") to also include data grains that contain new data written to the shared data block subsequent to performing the snapshot. The grains that are associated with a post-snapshot version of the virtual disk store data that was originally intended for locations within the shared data block, and data within the shared data block is never updated (e.g., such shared data blocks comprise the "in-place snapshot").

To implement the in-place snapshot technique, when hypervisor 214 receives a write request associated with a location within a shared data block of virtual disk 502, hypervisor 214 first determines the particular grain associated with the write request using the grain address resolution techniques described above. Hypervisor 214 then accesses grain bitmap 524 to select an unused grain for storing the write data associated with the write request. The selected grain, once written, is associated with the VM 203 transmitting the write request, as further discussed below. In one embodiment, write data associated with write requests transmitted to a shared block are all captured in grains included in the same logical data block, such that the entire logical data block is associated with post-snapshot changes to virtual disk 502. In such an embodiment, hypervisor 214 allocates a data block of virtual disk 502 ("write capture data block") and selects an unused grain within the write capture data block for storing the write data. In one embodiment, hypervisor 214 keeps track of which data block of virtual disk 502 is the current write capture data block in a metadata structure. For purposes of discussion, the grain associated with the write request is "grain X" and the selected unused grain is "grain Y." Once grain Y is selected, hypervisor 214 allocates the grain Y and copies the contents of grain X into grain Y. Hypervisor 214 then transmits the write data for storing in grain Y.

Hypervisor 214 also performs several metadata operations such that the VM 203 that transmitted the write request is able to access the write data stored in grain Y and any other VMs that share the data block of virtual disk 502 that includes grain X are still able to access the original data in grain X. First, hypervisor 214 updates grain bitmap 524 in sparse extent metadata 504 to indicate that the newly written grain Y is now used. Next, hypervisor 214 makes a copy of the data block of virtual disk 502 that includes sparse extent metadata 504. The copy of sparse extent metadata 504 includes copies of grain tables included in sparse extent metadata 504 as well as a copy of grain bitmap 524. Hypervisor 214 then identifies the copy of the grain table having a GTE that references grain X. The GTE is updated to reference grain Y instead. Finally, hypervisor 214 updates the file Mode associated with the VM 203 that transmitted the write request to point to the logical block of virtual disk 502 storing the copy of sparse extent metadata instead of the logical block of virtual disk 502 storing sparse extent metadata 504.

The following example illustrates the in-place snapshot technique described above in operation. Assume VM 203(0) is associated with file Mode 602 of FIG. 6A, VM 203(1) is associated with file Mode 604 of FIG. 6A and data block 508 of virtual disk 502 is being shared by VM 203(0) and VM 203(1). Assume also that grain 510 ("grain X 510") has not been written to since data block 508 was shared.

VM 203(0) transmits a write request which is received by hypervisor 214 and determined by hypervisor 214 to be associated with grain X 510. Hypervisor 214 first accesses grain bitmap 524 to select an unused grain for storing the write data associated with the write request. Based on grain bitmap 524, hypervisor 214 selects grain Y 609. In one embodiment, data block 605 that includes grain Y 609 is a "write capture data block" allocated by hypervisor 214 for storing write data associated with a shared data block of virtual disk 502. Once grain Y 609 is selected, hypervisor 214 allocates grain Y 609 and copies the contents of grain X 510 into grain Y 609. Hypervisor 214 then transmits the write data for storing in grain Y 609.

Hypervisor 214 also performs several metadata updates, as shown in FIGS. 6B and 6C. FIG. 6B illustrates a detailed view of grain table 520 and grain bitmap 524 after the write request associated with grain X is processed. Hypervisor 214 updates bitmap entry 610 in grain bitmap 524 corresponding to the newly written grain Y 609 to indicate that the grain is no longer available, i.e., the grain is "used." GTE 522 that includes a reference to grain X 510 remains unchanged.

FIG. 6C illustrates a detailed view of a sparse extent metadata copy 620 created after the write request associated with grain X is processed. As shown, sparse extent metadata copy 620 includes a copy of grain table 520 included in sparse extent metadata 504 as well as a copy of grain bitmap 524. GTE 624, that originally included a reference to grain X 510 is updated by hypervisor 214 to reference grain Y 609 instead.

Finally, hypervisor 214 updates file inode 602 associated with the VM 203(0), which transmitted the write request, to point to the logical block of virtual disk 502 storing the sparse extent metadata copy 620 instead of the logical block of virtual disk 502 storing sparse extent metadata 504.

Subsequently, if VM 203(0) transmits a read request specifying the location of grain X 510, hypervisor 214, using sparse extent metadata copy 620 and the grain address resolution mechanism discussed above, returns the data stored in grain Y 609 instead. However, if VM 203(1) transmits a read request specifying the location of grain X 510, hypervisor 214, using sparse extent metadata 504 and the grain address resolution mechanism discussed above, returns the data stored in grain X 510. In such a manner, the VM 203 that writes to a grain in a shared data block seamlessly accesses the new data, while any other VMs 203 sharing the data block are still able to access the original data in the grain.

Figure 7A:
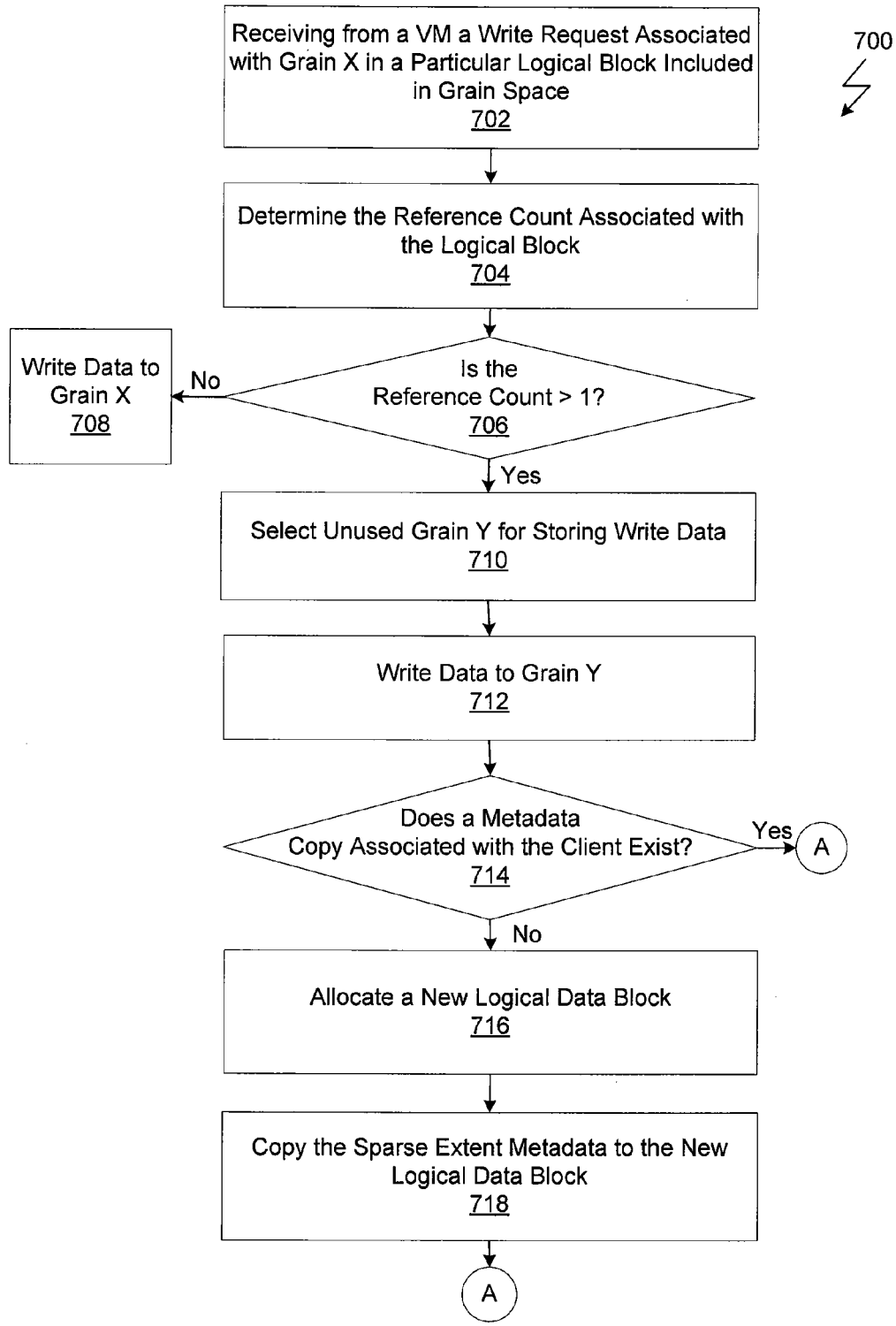
FIGS. 7A and 7B set forth a flow diagram of method steps for writing to a data block shared by multiple virtual machines, according to an embodiment.
Figure 7B:
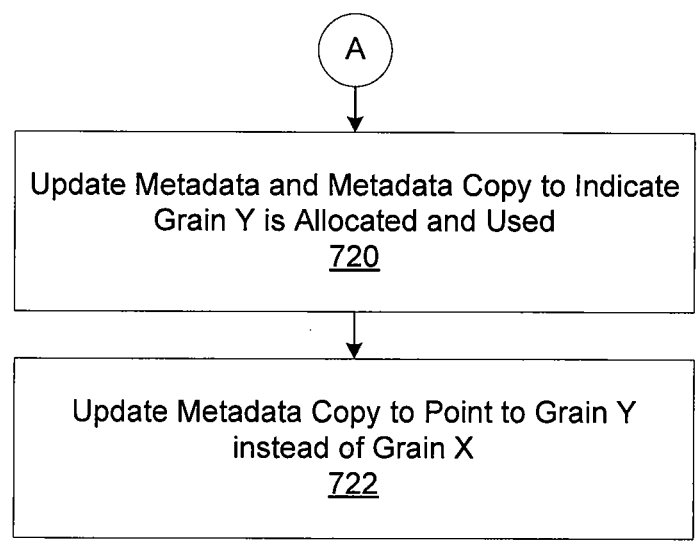

FIGS. 7A and 7B set forth a flow diagram of method steps for writing to a data block shared by multiple virtual machines, according to an embodiment. While the example operations are depicted as being performed by the systems illustrated in FIGS. 1-2, it is contemplated that embodiments of the invention may be performed by other suitable systems.

Method 700 begins at step 702, where hypervisor 214 receives a write request from a VM 203 served by virtual disk 502. Hypervisor 214 determines that the write request is associated with a particular grain ("grain X") of a logical block included in grain space 506 of virtual disk 502. At step 704, hypervisor 214 determines the reference count associated with the logical block that includes grain X. As discussed above, the reference count indicates the number of VMs 203 that share the logical block.

At step 706, hypervisor 214 determines whether the reference count associated with the logical block is greater than one, i.e., whether two or more VMs 203 are sharing the logical block. If not, then method 700 proceeds to step 708, where hypervisor 214 transmits the write data to grain X for storage. If, however, the logical block is shared, then method 700 proceeds to step 710.

At step 710, hypervisor 214 accesses grain bitmap 524 to select an unused grain ("grain Y") for storing the write data associated with the write request. In one embodiment, write data associated with write requests transmitted to a shared block are all captured in the same logical data block. In such an embodiment, hypervisor 214 allocates a data block of virtual disk 502 ("write capture data block"), if one has already not been allocated, and selects an unused grain within the write capture data block for storing the write data. Once the grain Y is selected, hypervisor 214 copies the contents of grain X into grain Y. At step 712, hypervisor 214 transmits the write data for storing in grain Y.

Next, at step 714, hypervisor 214 determines whether a copy of sparse extent metadata associated with the VM 203 that transmitted the write request exists. If not, then method 700 proceeds to step 716, where hypervisor 214 allocates a new logical block of virtual disk 502. At step 718, hypervisor 214 stores a copy of sparse extent metadata in the new logical block and updates the file inode associated with the VM 203 that transmitted the write request to point to the logical block of virtual disk 502 storing the copy of sparse extent metadata At step 720, hypervisor 214 updates grain bitmap 524 in sparse extent metadata 504 to indicate that the newly written grain Y is now used. Hypervisor 214 also updates the copy of grain bitmap 524 included in the copy of the sparse extent metadata associated with the VM 203 that transmitted the write request to indicate that the newly written grain Y is now used. At step 722, hypervisor 214 identifies the copy of the grain table in the copy of the sparse extent metadata having a GTE that references grain X and updates the GTE to reference grain Y instead.

One advantage of the present technique is that writes to a shared data block are performed with minimal data movement operations. More specifically, when a VM writes to a shared data block, only a grain, which is much smaller in size than the entire data block, is copied and written. Therefore, writes to a shared block are fast and space efficient because the entire shared data block does not need to be copied when the VM writes to the shared data block.

Although the inventive concepts disclosed herein are described with reference to specific implementations, many other variations are possible. For example, although the embodiments described herein refer to data block sizes of 4 KB, 1 MB and 512 KB, it should be recognized that alternative embodiments may utilize any various data block sizes consistent with the teachings herein. Further, although embodiments of processes and methods herein are described in terms of certain steps, it should be recognized that such described steps do not connote any particular ordering of such steps and that alternative embodiments may implement such steps in differing orders. Similarly, the inventive techniques and systems described herein may be used in both a hosted and a non-hosted virtualized computer system, regardless of the degree of virtualization, and in which the virtual machine (s) have any number of physical and/or logical virtualized processors. In addition, the invention may also be implemented directly in a computer's primary operating system, both where the operating system is designed to support virtual machines and where it is not. Moreover, the invention may even be implemented wholly or partially in hardware, for example in processor architectures intended to provide hardware support for virtual machines. Further, the inventive system may be implemented with the substitution of different data structures and data types, and resource reservation technologies other than the SCSI protocol. Also, numerous programming techniques utilizing various data structures and memory configurations may be utilized to achieve the results of the inventive system described herein. For example, tables, record structures, objects and other data structures may all be implemented in different configurations, redundant, distributed, etc., while still achieving the same results.

The inventive features described herein may be applied in non-virtualized embodiments having applications running on top of an operating system and a filter driver implemented on top of a native file system driver of the operating system. The filter driver in such embodiments may be implemented in software or hardware and is configured to expose and manage thinly-provisioned files in a similar manner as the virtual disk in the virtualized embodiments.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for preserving a current state of a virtual disk in response to a write request from a virtual machine, wherein the write request is associated with a data block of the virtual disk which is shared by a plurality of virtual machines and each of the virtual machines access the virtual disk using a different file descriptor, the method comprising:
    determining that the write request from the virtual machine corresponds to a portion of a first data block;
    writing data corresponding to the write request to a portion of a second data block of the virtual disk, in response to determining a desirable location to store the portion of the second data block;
    copying metadata in the virtual disk into a third data block of the virtual disk, wherein the metadata reflects a state of the virtual disk prior to the write request and is used to determine locations of data within the virtual disk in response to I/O requests;
    modifying a reference in the copied metadata that points to the portion of the first data block to point to the portion of the second data block; and
    configuring a file descriptor used by the virtual machine to access the virtual disk to reference the third data block including the modified metadata such that any subsequent read requests received from the virtual machine for reading data corresponding to the write request are serviced by transmitting data read from the portion of the second data block rather than from the portion of the first data block.

2. The method of claim 1, further comprising, upon receiving the write request, determining that at least one other virtual machine references the first data block, wherein upon said determining, performing the steps of said writing, said copying, said modifying, and said configuring.

3. The method of claim 2, wherein determining that at least one other virtual machine references the first data block comprises determining that a reference count associated with the first data block is greater than one.

4. The method of claim 1, further comprising, prior to writing the data to the portion of the second data block, determining that the portion of the second data block is unused and allocating the portion of the second data block for servicing the write request, wherein upon said determining, the steps of said writing, said copying, said modifying, and said configuring are performed.

5. The method of claim 1, wherein portions in the second data block are allocated to service write requests received from the virtual machine for writing to portions in the first data block.

6. The method of claim 1, further comprising updating the copy of the metadata to identify the portion of the second data block as a used portion.

7. The method of claim 1, further comprising:
    receiving a read request from the virtual machine for reading data from the portion of the first data block;
    determining, based on the modified copy of the metadata, that the reference points to the portion of the second data block and
    servicing the read request by transmitting data read from the portion of the second data block to the virtual machine.

8. The method of claim 1, further comprising receiving a second write request from a second virtual machine included in the plurality of virtual machine for writing data to the portion of the first data block, writing the data to another portion of the second data block to make a second copy of the metadata associated with the virtual disk, and updating the second copy of the metadata to modify a reference that points to the portion of the first data block to point to the another portion of the second data block.

9. The method of claim 1, further comprising analyzing an address included in the write request to identify a first entry in a first data structure that is associated with a first location, and analyzing the first entry to identify a second entry in a second data structure to determine that the address included in the write request is associated with the portion of the first data block of the virtual disk.

10. A non-transitory computer readable medium storing instructions that, when executed by a processor, cause the processor to preserve a current state of a virtual disk in response to a write request from a virtual machine, wherein the write request is associated with a data block of the virtual disk which is shared by a plurality of virtual machines and each of the virtual machines access the virtual disk using a different file descriptor, by performing steps comprising:
    determining that the write request from the virtual machine corresponds to a portion of a first data block;
    writing data corresponding to the write request to a portion of a second data block of the virtual disk, in response to determining a desirable location to store the portion of the second data block;
    copying metadata in the virtual disk into a third data block of the virtual disk, wherein the metadata reflects a state of the virtual disk prior to the write request and is used to determine locations of data within the virtual disk in response to I/O requests;
    modifying a reference in the copied metadata that points to the portion of the first data block to point to the portion of the second data block; and
    configuring a file descriptor used by the virtual machine to access the virtual disk to reference the third data block including the modified metadata such that any subsequent read requests received from the virtual machine for reading data corresponding to the write request are serviced by transmitting data read from the portion of the second data block rather than from the portion of the first data block.

11. The computer readable medium of claim 10, the steps further comprising, upon receiving the write request, determining that at least one other virtual machine references the first data block, wherein upon said determining, performing the steps of said writing, said copying, said modifying, and said configuring.

12. The computer readable medium of claim 11, wherein determining that at least one other virtual machine references the first data block comprises determining that a reference count associated with the first data block is greater than one.

13. The computer readable medium of claim 10, the steps further comprising, prior to writing the data to the portion of the second data block, determining that the portion of the second data block is unused and allocating the portion of the second data block for servicing the write request, wherein upon said determining, the steps of said writing, said copying, said modifying, and said configuring are performed.

14. The computer readable medium of claim 10, wherein portions in the second data block are allocated to service write requests received from the virtual machine for writing to portions in the first data block.

15. The computer readable medium of claim 10, the steps further comprising updating the copy of the metadata to identify the portion of the second data block as a used portion.

16. The computer readable medium of claim 10, the steps further comprising:
- receiving a read request from the virtual machine for reading data from the portion of the first data block;
- determining, based on the modified copy of the metadata, that the reference points to the portion of the second data block; and
- servicing the read request by transmitting read data from the portion of the second data block to the virtual machine.

17. The computer readable medium of claim 10, the steps further comprising:
- receiving a second write request from a second virtual machine included in the plurality of virtual machine for writing data to the portion of the first data block;
- writing the data to another portion of the second data block to make a second copy of the metadata associated with the virtual disk; and
- updating the second copy of the metadata to modify a reference that points to the portion of the first data block to point to the another portion of the second data block.

18. The computer readable medium of claim 10, the steps further comprising analyzing an address included in the write request to identify a first entry in a first data structure that is associated with a first location, and analyzing the first entry to identify a second entry in a second data structure to determine that the address included in the write request is associated with the portion of the first data block of the virtual disk.

19. A computer system having virtual machines executed therein and having virtual disks for the virtual machines provisioned in a non-transitory storage device, the computer system being programmed to execute a method for preserving a current state of a virtual disk in response to a write request from a virtual machine, wherein the write request is associated with a data block of the virtual disk which is shared by a plurality of virtual machines and each of the virtual machines access the virtual disk using a different file descriptor, the method comprising:
- determining that the write request from the virtual machine corresponds to a portion of a first data block;
- writing data corresponding to the write request to a portion of a second data block of the virtual disk, in response to determining a desirable location to store the portion of the second data block;
- copying metadata in the virtual disk into a third data block of the virtual disk, wherein the metadata reflects a state of the virtual disk prior to the write request and is used to determine locations of data within the virtual disk in response to I/O requests;
- modifying a reference in the copied metadata that points to the portion of the first data block to point to the portion of the second data block; and
- configuring a file descriptor used by the virtual machine to access the virtual disk to reference the third data block including the modified metadata such that any subsequent read requests received from the virtual machine for reading data corresponding to the write request are serviced by transmitting data read from the portion of the second data block rather than from the portion of the first data block.

20. The computer system of claim 19, wherein the method further comprises, upon receiving the write request, determining that at least one other virtual machine references the data, wherein upon said determining, performing the steps of said writing, said copying, said modifying, and said configuring.

21. The computer system of claim 19, wherein the method further comprises:
- receiving a read request from the virtual machine for reading data from the first portion of the first data block;
- determining, based on the modified copy of the metadata, that the reference points to the portion of the second data block; and
- servicing the read request by transmitting data read from the portion of the second data block to the virtual machine.

\* \* \* \* \*